(12) United States Patent
Kuroki et al.

(10) Patent No.: US 7,207,408 B2
(45) Date of Patent: *Apr. 24, 2007

(54) REINFORCING SUPPORT STRUCTURE FOR A THREE-WHEELED MOTOR VEHICLE, AND THREE-WHEELED MOTOR VEHICLE INCORPORATING SAME

(75) Inventors: Masahiro Kuroki, Saitama (JP); Shinji Takayanagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

This patent is subject to a terminal disclaimer.

(21) Appl. No.: 10/804,479

(22) Filed: Mar. 19, 2004

(65) Prior Publication Data

US 2004/0188167 A1   Sep. 30, 2004

(30) Foreign Application Priority Data

Mar. 20, 2003   (JP) ............... 2003-077240

(51) Int. Cl.
B62D 61/06   (2006.01)
B60G 9/02   (2006.01)

(52) U.S. Cl. ............... 180/210; 280/124.134; 280/124.111

(58) Field of Classification Search ........... 180/210; 280/124.111, 124.112, 124.103, 124.106, 280/124.07, 124.134

See application file for complete search history.

(56) References Cited

U.S. PATENT DOCUMENTS

| | | | | |
|---|---|---|---|---|
| 3,598,385 A | * | 8/1971 | Parsons, Jr. ............ | 267/30 |
| 4,003,443 A | * | 1/1977 | Boughers ............... | 180/217 |
| 4,316,520 A | * | 2/1982 | Yamamoto et al. ...... | 180/215 |
| 4,470,611 A | * | 9/1984 | Duphily et al. ......... | 280/104 |
| 4,546,997 A | * | 10/1985 | Smyers ............... | 280/5.509 |
| 4,887,829 A | * | 12/1989 | Prince ................ | 280/282 |
| 5,364,114 A | * | 11/1994 | Petersen ............ | 280/124.151 |
| 6,276,480 B1 | * | 8/2001 | Aregger .............. | 180/213 |
| 2004/0035628 A1 | * | 2/2004 | Takayanagi et al. ..... | 180/210 |
| 2004/0119259 A1 | * | 6/2004 | Takayanagi et al. .. | 280/124.134 |
| 2004/0144591 A1 | * | 7/2004 | Kuroki et al. ......... | 180/337 |

FOREIGN PATENT DOCUMENTS

JP  UM-A 59-106723   7/1984
JP  UM-B-63-21445   6/1988

* cited by examiner

Primary Examiner—Paul N. Dickson
Assistant Examiner—Tiffany L. Webb
(74) Attorney, Agent, or Firm—Carrier, Blackman & Associates, P.C.; William D. Blackman; Joseph P. Carrier

(57) ABSTRACT

A three-wheeled motor vehicle includes a through coupling situated between right and left internal shafts and rear wheels, each via a drive shaft. The axial lines of right and left internal shafts are both intersected with a straight line as a rocking axis. If the right and left internal shafts are placed away from each other in the front and rear of the vehicle body, the drive shaft can be placed extensively in the diagonal direction from the right and left internal shafts to the rear wheel side. Using the described structure, the total length of the drive shaft can be increased. In consideration thereof, the bending angle of the drive shaft can be minimized when the rear drive wheels move in the vertical direction, and the track of the rear wheels can be reduced because the drive shaft is placed extensively in the diagonal direction.

10 Claims, 26 Drawing Sheets

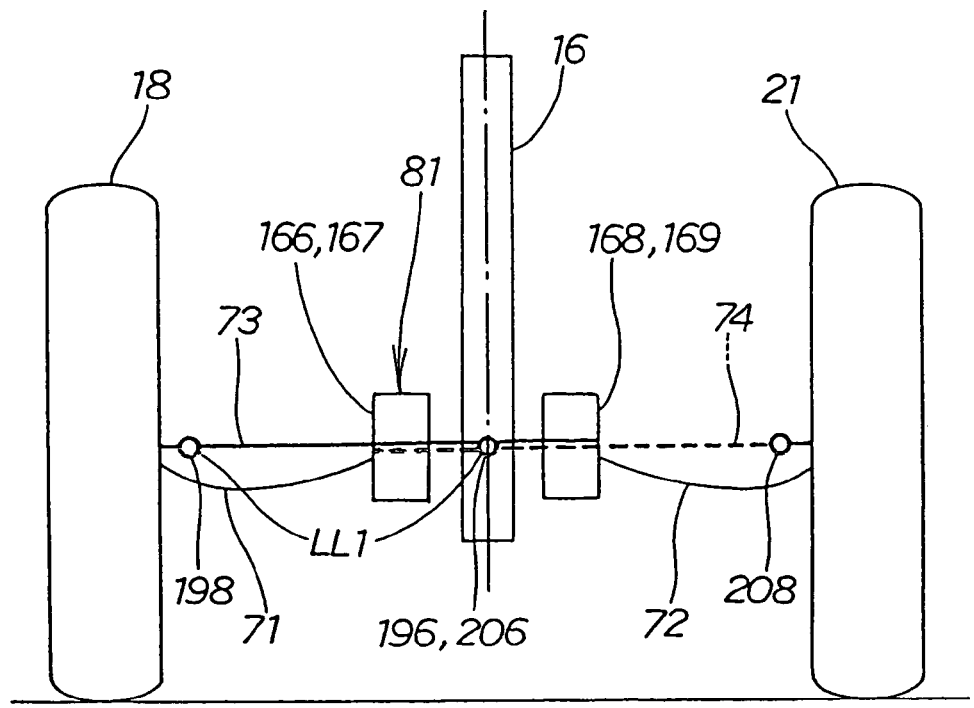
Fig. 21(a) EXAMPLE
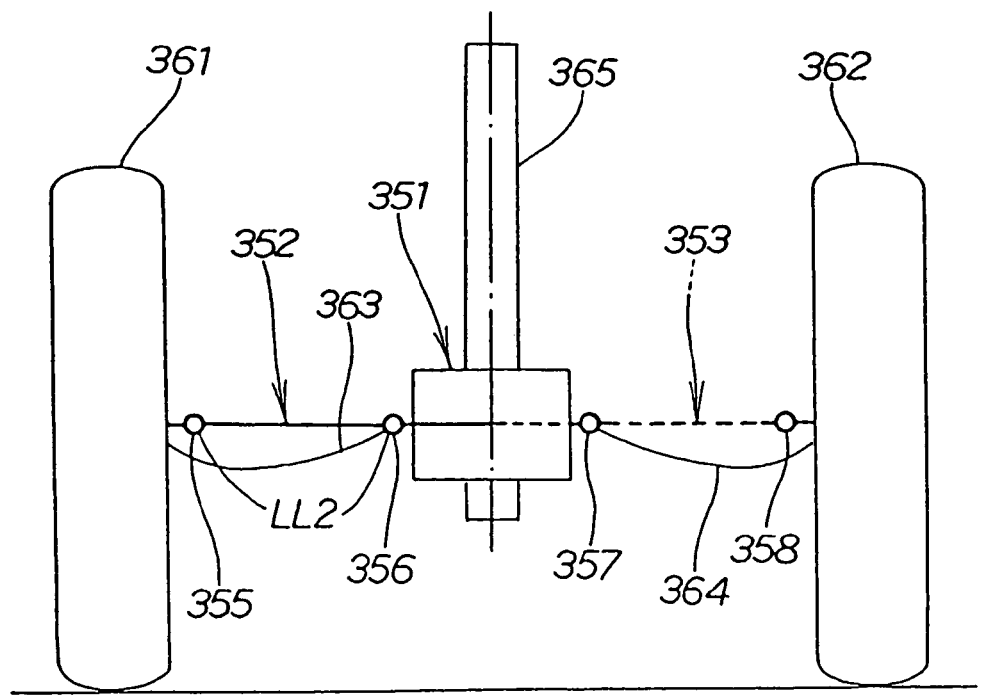
Fig. 21(b) COMPARISON EXAMPLE

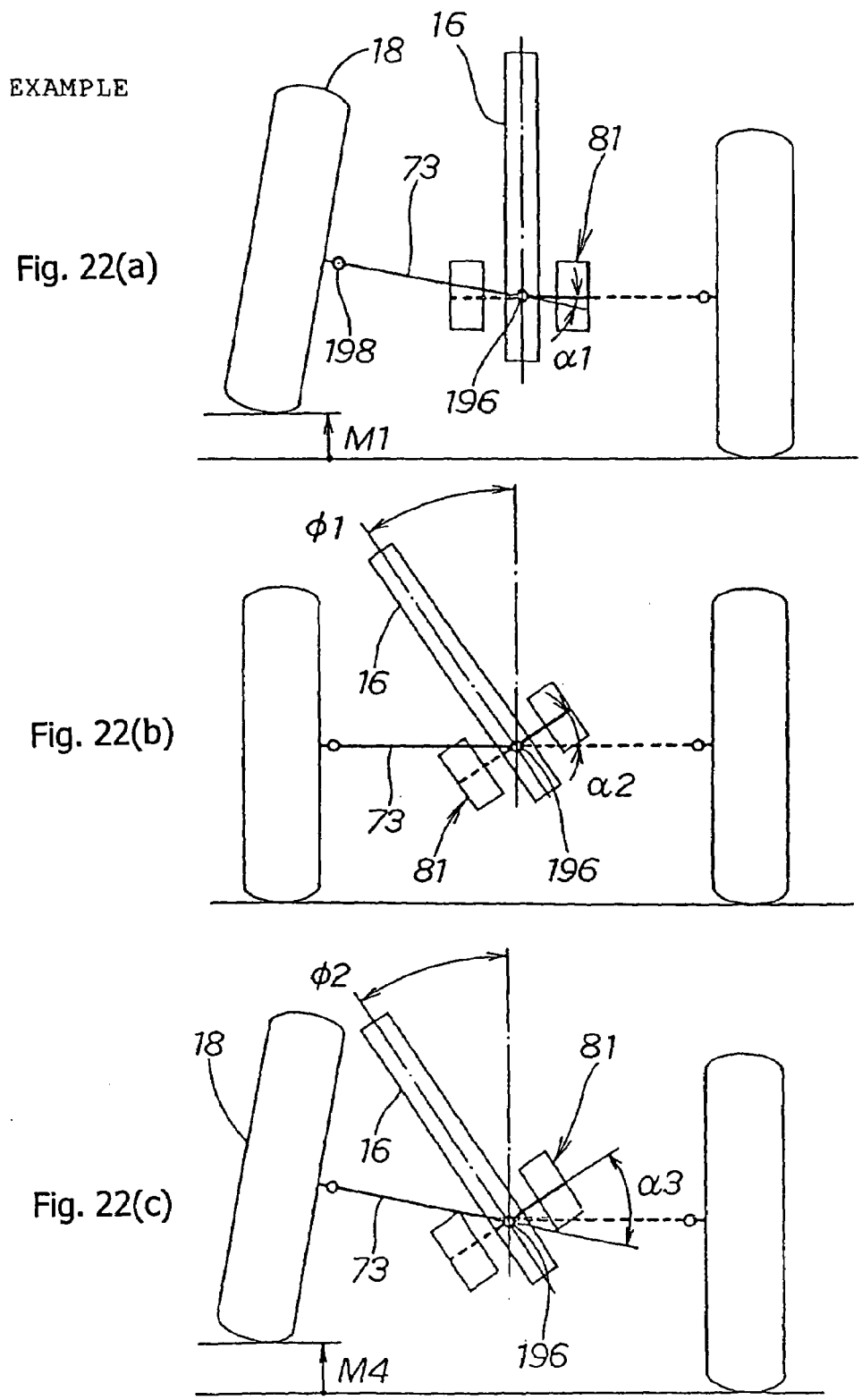

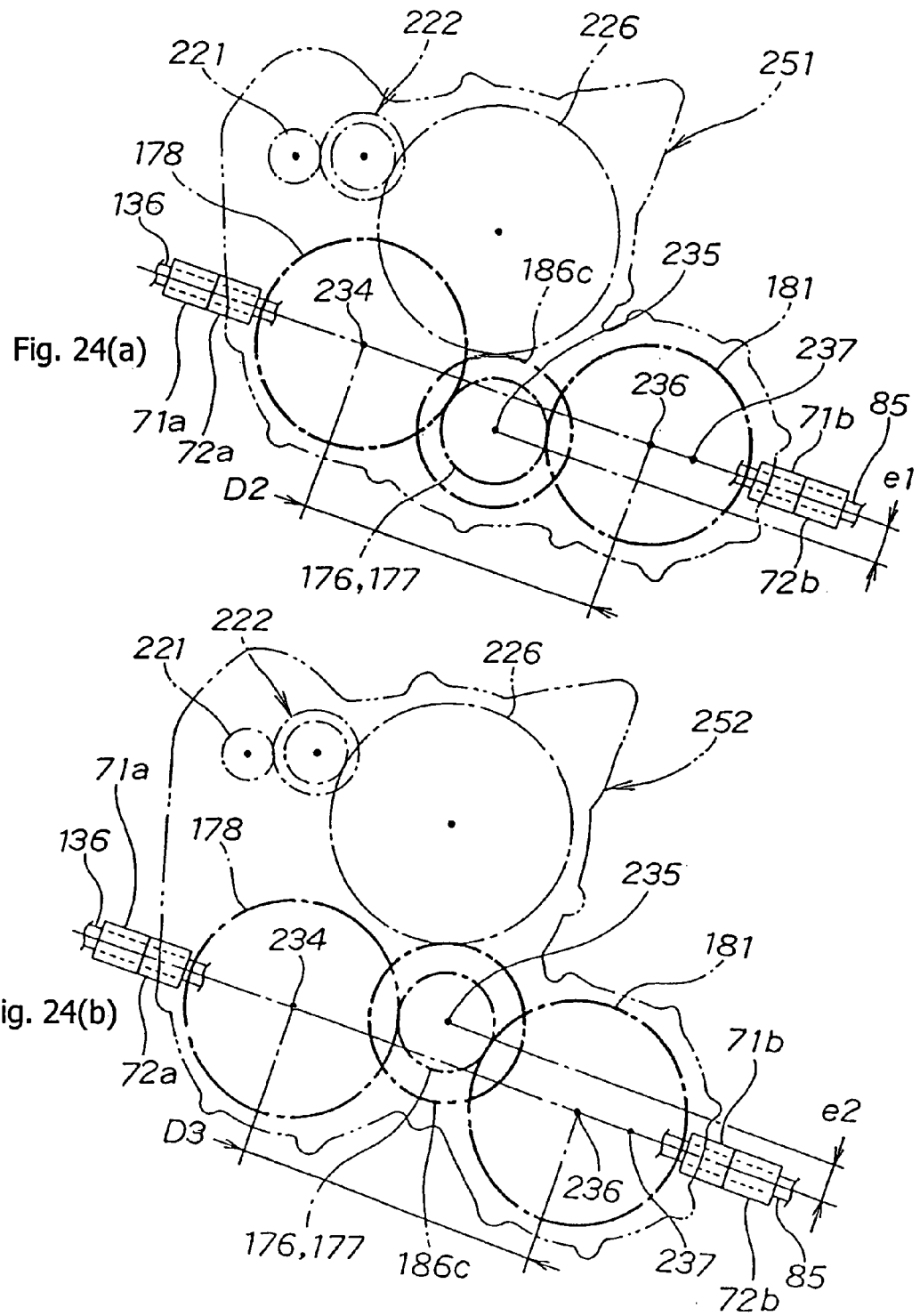

PRIOR ART

REINFORCING SUPPORT STRUCTURE FOR A THREE-WHEELED MOTOR VEHICLE, AND THREE-WHEELED MOTOR VEHICLE INCORPORATING SAME

CROSS-REFERENCE TO RELATED APPLICATIONS

The present invention claims priority under 35 USC 119 based on Japanese patent application No. 2003-077240, filed Mar. 20, 2003.

BACKGROUND OF THE INVENTION

1. Field of the Invention

The present invention relates to a reinforcing support structure for a three-wheeled motor vehicle, and to a three-wheeled vehicle incorporating the described reinforcing support structure. More particularly, the present invention relates to a reinforcing support structures and to a three-wheeled motor vehicle in which a main frame cage is pivotally rockable about a rocking axis, with respect to a rear wheel support structure.

2. Description of the Background Art

One example of a known power transmission for a vehicle has rear wheels attached at the tips of right and left axles that extend concentrically from a differential gear to the right and left sides of the vehicle body, respectively. Examples of this type of design can be found in Japanese published patent documents JP-UM-B-63-21445 (page 2, FIG. 3) and in JP-UM-B-59-106723 (pages 4 to 5, FIG. 3).

FIG. 25 of the appended drawings is a reproduction of FIG. 3 from Japanese published patent document JP-UM-B-63-21445, and is included herein for comparative discussion purposes. Here, reference numerals are changed from those used in the original.

FIG. 25 is a top plan view showing a power transmission mechanism of a conventional three-wheeled motor vehicle. Shown therein is a vehicle 300 in which an output of an engine 301 is transmitted to a differential gear 304 via chains 302 and 303. In the prior art vehicle 300 illustrated in FIG. 25, rear wheels 307 and 307 are respectively rotatably attached to the outer tip ends of rear wheel axles 305 and 306, which extend from the differential gear 304, in opposite directions, to the sides of the vehicle. With such a structure, the rear wheels 307 and 307 are driven.

In the vehicle shown in FIG. 25 above, the rear wheel axles 305 and 306 are extended, to right and left, from both sides of the differential gear 304, to be coupled with the rear wheels 307 and 307. With such a placement, if the right and left rear wheels 307 and 307 are to be independently suspended, the right and left rear wheels 307 and 307 are each attached to the vehicle body side in such a manner as to move in the vertical direction via each corresponding suspension arm. The rear wheel axles 305 and 306 are used in a drive shaft including a constant velocity joint, for example.

The drive shaft can transmit the driving forces to the rear wheels 307 and 307 even if the rear wheels 307 and 307 move in the vertical direction. For such transmission, however, the pivot angle of the constant velocity joint being a part of the drive shaft has to be a predetermined angle or smaller. Accordingly, if the total length of the drive shaft is short, it will cause difficulty in reducing such a pivot angle.

In order to make the pivot angle relative to the drive shaft equal to or smaller than the predetermined angle, there is a need to increase the total length of the drive shaft. As a result, the distance between the centers of the right and left rear wheels, i.e., the tread (or wheel base), which denotes a horizontal distance between the centers of right and left tire tracks contacting the road surface) is increased, thereby rendering the vehicle wider. Thus, it is hardly applicable to small-sized vehicles, resultantly impairing the vehicle mobility.

FIG. 26 of the appended drawings is a reproduction of FIG. 3 from Japanese published patent document JP-UM-B-59-106723. Here, reference numerals are changed from those used in the original.

FIG. 26 is a cross-sectional view of a transmission of a conventional three-wheeled motor vehicle. Shown therein is a portion of a vehicle powertrain, in which an engine 311 is coupled with an automatic belt-driven transmission 312, and a differential gear 314 accommodated in a gear box 313 is coupled with the belt-driven automatic transmission 312 via gears and chains, and rear wheel axles 316 and 316 are attached, respectively, to the right and left sides of the differential gear 314. Rear wheels 317 and 317 are attached, respectively, to these rear wheel axles 316 and 316.

Although the known devices have some utility for their intended purposes, there is still a need to provide an improved three-wheeled motor vehicle and reinforcing support structure therefor. More particularly, there is a need for an improved three-wheeled motor vehicle and related support structure, in which a main frame cage can pivotally rock about a rocking axis with respect to a rear wheel support structure.

SUMMARY OF THE INVENTION

Therefore, an object of the present invention is, through improvement of a three-wheeled motor vehicle, to reduce the tread of rear wheels while suppressing the pivot angle of a drive shaft structuring a power transmission mechanism to be a predetermined angle or smaller.

To achieve the above object, a first aspect of the present invention is directed to a three-wheeled motor vehicle in which a main frame cage is provided with a swing axis, right and left suspension arms are each pivotally attached to the main frame cage along the swing axis.

A rear drive wheel is attached to each of the suspension arms, and the main frame cage is made rockable by a rocking arm with respect to the suspension arms. Engine output is transferred to the right and left rear drive wheels via a transmission, a reduction gear, and right and left output axes provided to the reduction gear, wherein the right and left output axes both intersect with the rocking axis, and the points of intersection of the left and right output axis with the rocking axis are not coincident.

The right and left output axes both intersect with the rocking axis. Accordingly, through coupling between these right and left output axes and rear drive wheels via a drive shaft, the drive shaft does not displace that much even if the main frame cage rocks in the lateral direction.

Further, intersection points of the right and left output axes with the rocking axis are each placed in a different position along the rocking axis. Accordingly, if the right and left output axes are so provided as to be spaced apart from each other in the front and rear direction of the vehicle body, for example, the drive shaft can be placed extensively in the diagonal direction from the right and left output axes to the rear drive wheel side.

As such, compared with a case where the right and left output axes are provided on the side part of the transmission or the reduction gear, the total length of the drive shaft can be increased in the present invention. In consideration thereof, the pivot angle of the drive shaft can be suppressed to a small value when the rear drive wheels move in the vertical direction, and what is better, the tread of the rear drive wheels can be reduced because the drive shaft is placed extensively in the diagonal direction even if it is long in total length.

According to a second aspect of the present invention, the rear drive wheel is coupled to the output axes via a drive shaft including a pair of constant velocity joints, and a pivoting part of the constant velocity joint on the side of the output axis is placed on the rocking axis.

By placing the pivoting part of the constant velocity joint on the side of the output axis on the rocking axis, even if the output axes tilt responding to the vehicle body rocking in the lateral direction, the constant velocity joint remains still. Thus, even if the drive shaft swings together with the suspension arms, the pivot angle of the constant velocity joint can be reduced.

According to a third aspect of the present invention, the reduction gear includes a differential mechanism, and the right and left output axes are placed in the front and rear, respectively, of the differential mechanism.

This allows easy connection of two axes on the output side of the differential mechanism to right and left output axes using a gear and others, thereby realizing the reduction gear compact in size.

According to a fourth aspect of the present invention, the swing axis and the rocking axis are the same axis.

By structuring the swing axis and the rocking axis as one axis, the suspension arms can be shorter compared with a case where two swing axes are so provided as to be away from each other in the vehicle width direction. Accordingly, this reduces the tread of the right and left rear drive wheels, and narrows down the vehicle width. What is more, the number of components can be reduced, and cost reduction can be thus achieved.

According to a fifth aspect of the present invention, a differential pinion axis structuring the differential mechanism passes through the rocking axis.

In a case of structuring the reduction gear including the differential mechanism to rock with the main frame cage, the differential pinion axis comes to the center of the differential mechanism. Thus, the inertial moment of the differential mechanism about the rocking axis can be reduced when the main frame cage rocks. As such, the main frame cage can rock with a quick motion, successfully increasing the mobility of the three-wheeled motor vehicle.

According to a fifth aspect of the present invention, through placement of the engine, the transmission, the reduction gear, and the right and left output axes on the side of the main frame cage, these components structurally rock against the right and left rear drive wheels.

With such a structure having no engine, transmission, reduction gear, nor right and left output axes on the side of the suspension arms, when a suspension spring is provided on the side of the suspension arms, the unsprung weight can be considerably reduced. Accordingly, the ride comfort can be better to a greater degree.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 21(a) and (b) are rear views for comparison of the total length of drive shaft according to an illustrative embodiment of the present invention.

FIGS. 22(a), (b), and (c) are rear elevational effect views illustrating the effects achieved by the example drive shaft according to an illustrative embodiment of the present invention.

FIGS. 24(a) and (b) are side views showing another embodiment of the gear train of the gearbox according to an illustrative embodiment of the present invention.

DETAILED DESCRIPTION

Figure 1:
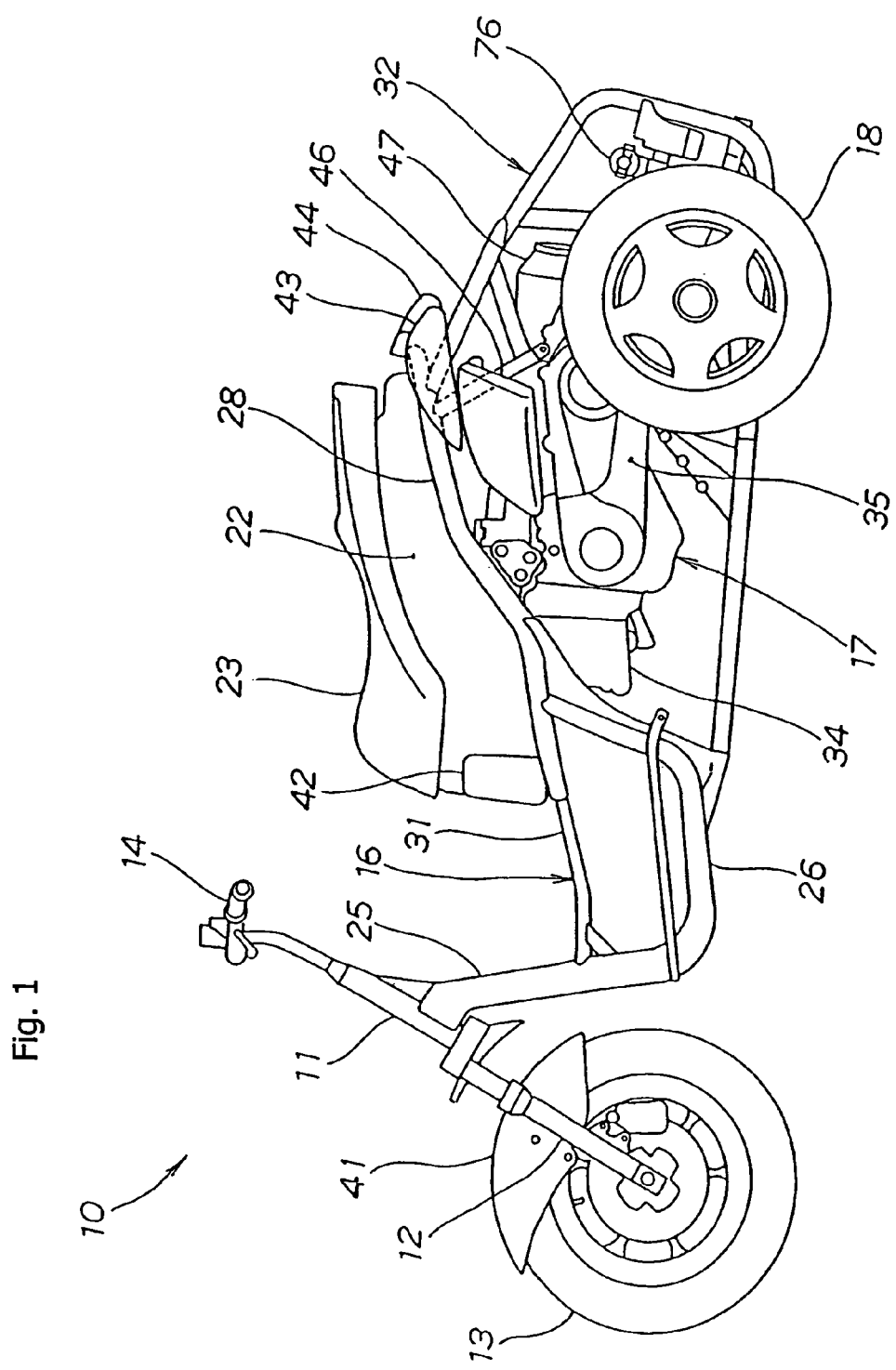
FIG. 1 is a side elevational view of a three-wheeled motor vehicle according to a selected illustrative embodiment of the present invention.

FIG. 1 is a side view of a three-wheeled motor vehicle according to an illustrative embodiment of the present invention. Therein, a three-wheeled motor vehicle 10 with a rocking mechanism is shown. The three-wheeled motor vehicle 10 is provided with a front fork 12, pivotally attached to a head pipe 11, via a (not-shown) handlebar axis to be steerable. The three-wheeled motor vehicle 10 also includes a front wheel 13 attached to the lower end of the front fork 12, a handlebar 14 attached to the front fork 12 to turn concurrently therewith, and a main frame cage 16 attached to the rear part of the head pipe 11.

The three-wheeled motor vehicle 10 further includes a powertrain unit 17, attached to the rear part of the main frame cage 16, and rear wheels 18 and 21 (rear wheel 21 locating back behind is not shown in FIG. 1) driven by the powertrain unit 17.

A housing box 22 is attached to the upper part of the main frame cage 16, and a seat 23 is attached to the upper part of the housing box 22 to freely open or close.

The main frame cage 16 includes a down pipe 25 extending downward toward the rear from the head pipe 11; a pair of right and left lower pipes 26 and 27 (lower pipe 27 locating back behind is not shown) extending toward the rear and then upward toward the rear from the lower part of the down pipe 25; a central upper frame 28 coupled to the rear parts of these lower pipes 26 and 27; a center pipe 31 extending toward the rear from the down pipe 25 to be coupled to the center upper frame 28; and a J frame 32 in the shape of letter J viewed from the side, being coupled to the rear parts of the lower pipes 26 and 27 and the rear side part of the center upper frame 28.

The center upper frame 28 is a member provided for supporting the housing box 22, and for suspending the powertrain unit 17.

The J frame 32 is provided for attaching a rear suspension suspending the rear wheels 18 and 21, and a rocking mechanism with which the side of the main frame cage 16 can rock in the lateral direction with respect to the side of the rear suspension. Such rear suspension and rock mechanism will be described in more detail later.

The powertrain unit 17 includes an engine 34 placed toward the front of the vehicle body, and a power transmission mechanism 35 for transmitting the power of the engine 34 to the rear wheels 18 and 21.

Here, 41 denotes a front fender covering the upper part of the front wheel 13, 42 a battery, 43 a turn signal lamp, 44 a taillight, 46 an air cleaner, and 47 a muffler.

Figure 2:
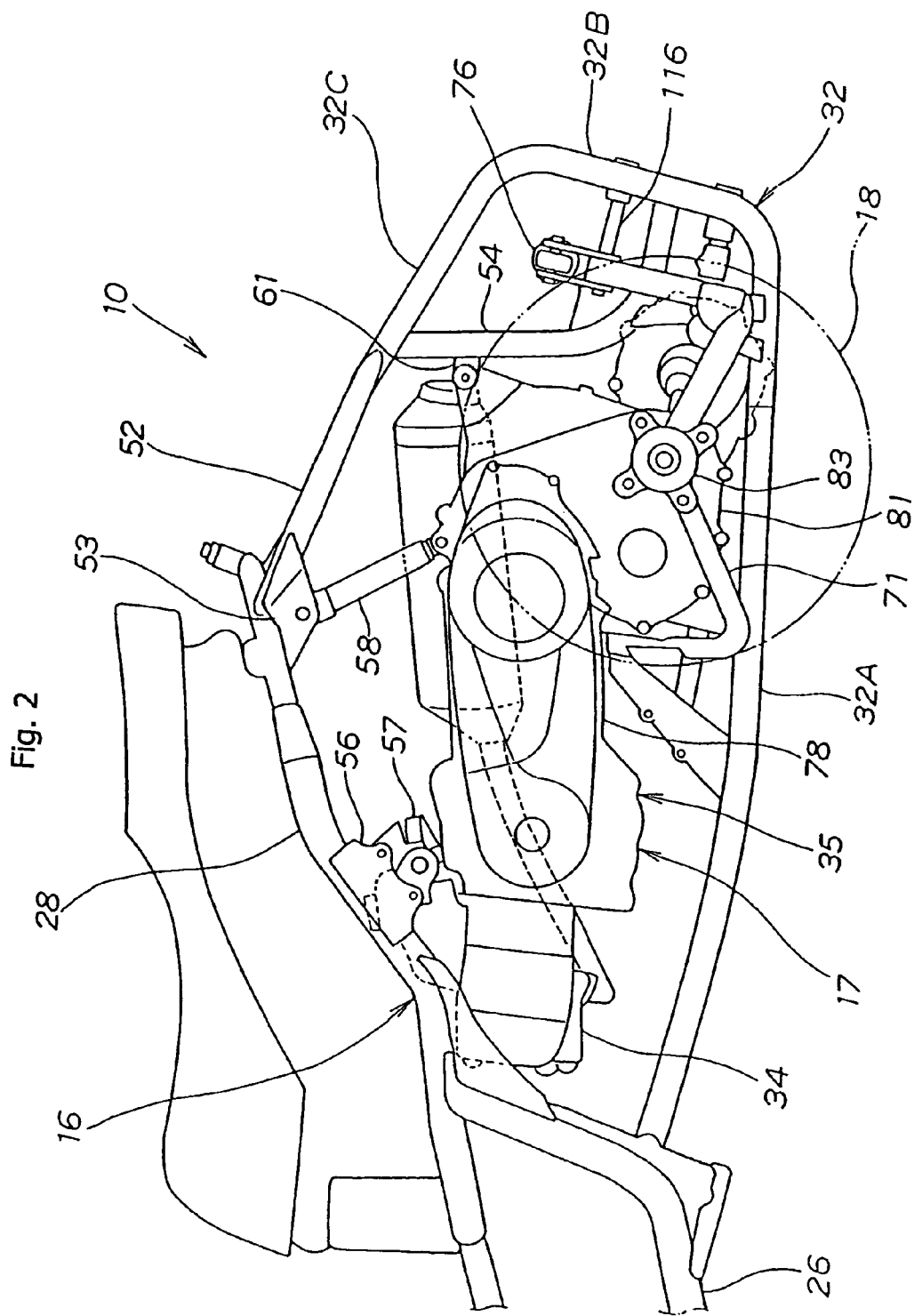
FIG. 2 is a detail side elevational view showing the main part of a three-wheeled motor vehicle according to an illustrative embodiment of the present invention.

FIG. 2 is a side view showing a main part of the three-wheeled motor vehicle according to the depicted embodiment of the present invention. Therein, coupling pipes 52 are placed across both the J frame 32 and the center upper frame 28, to couple together the upper part of the J frame 32 and the rear end of the center upper frame 28. Reinforcing plates 53 are attached to the coupling pipes 52 and 52 and the center upper frame 28. An L pipe 54, formed almost in the shape of the letter L viewed from the side, is attached to the inside of the rear part of the J frame 32. Brackets 56 are attached to the center upper frame 28, and the front upper part of the powertrain unit 17 is attached to the brackets 56 via a bridge member 57.

The rear part of the powertrain unit 17 is supported by extending a supporting rod 58 downward toward the rear from the reinforcing plates 53 and 53, and the rear end part of the powertrain unit 17 is attached by extending a protruding section 61 from the front part of the L pipe 54 toward the front. Herein, in the J frame 32, 32A, 32B, and 32C denote, respectively, a lower substantially horizontal section, a rear end slanting section in which the upper end side angles down toward the lower end side, and an upper part slanting section in which the front end part is moved upward from the rear end part.

Figure 3:
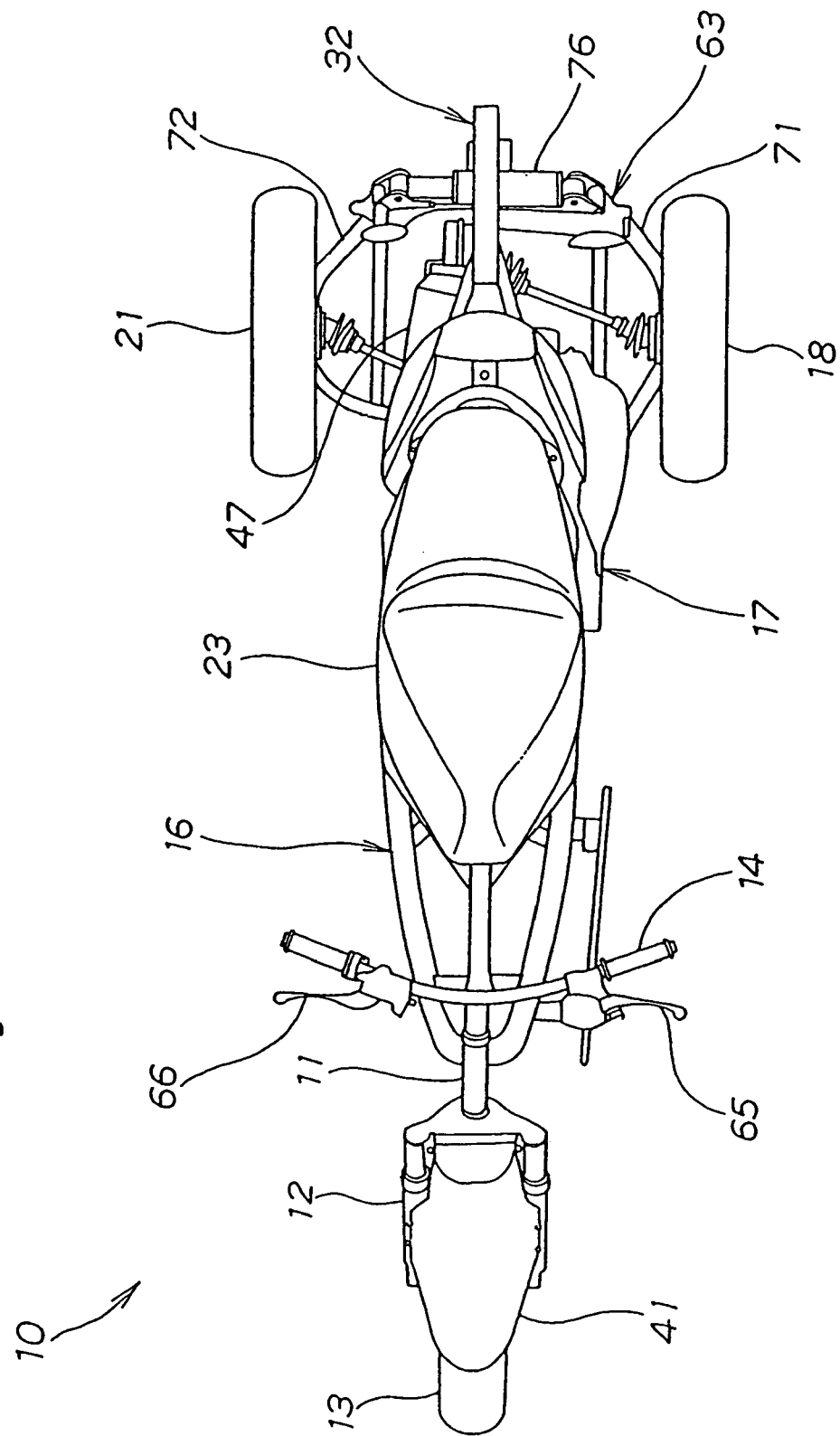
FIG. 3 is a top plan view of the three-wheeled motor vehicle according to an illustrative embodiment of the present invention.

FIG. 3 is a top plan view of the three-wheeled motor vehicle according to the first embodiment of the present invention. Therein, the rear part of the J frame 32 includes a single pipe, and a rear suspension 63 (which will be described in detail later) is attached to the J frame 32. Note here that numeral 65 denotes a brake lever for the rear wheels, and numeral 66 denotes a brake lever for the front wheel.

Figure 4:
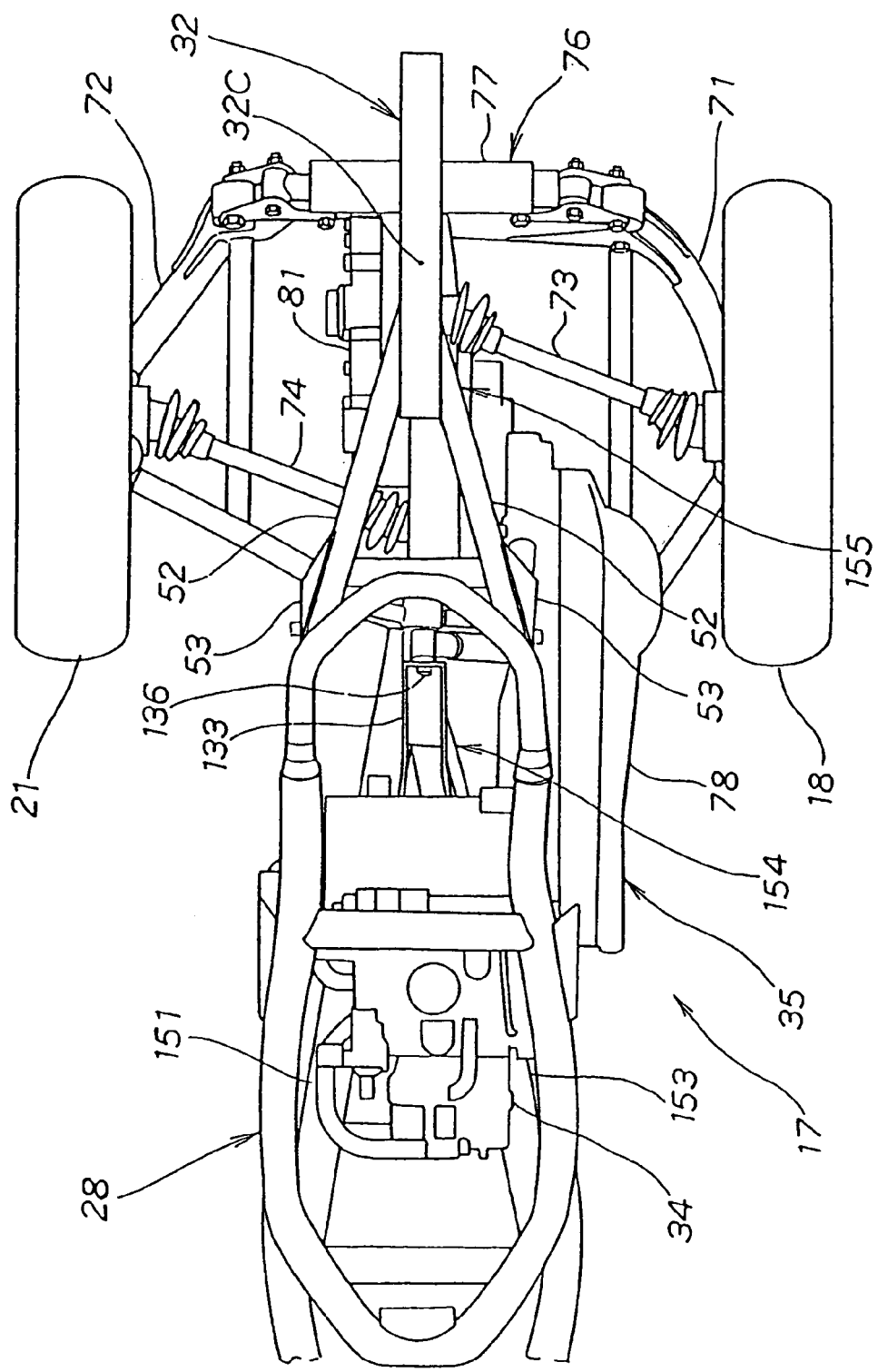
FIG. 4 is a detail top plan view showing the main part of the three-wheeled motor vehicle according to an illustrative embodiment of the present invention.

FIG. 4 is a detail top plan view showing the main part of the three-wheeled motor vehicle 10 according to the present invention. Shown therein is a rear wheel support structure, in which wishbone suspension arms 71 and 72 are attached to both sides of the J frame 32, a holder (not shown) is attached to at each tip of the wishbone suspension arms 71 and 72, the rear wheels 18 and 21 are respectively attached to the holders to be rotatable, and the rear wheels 18 and 21 are driven by drive shafts 73 and 74 structuring the power transmission mechanism 35 of the powertrain unit 17.

Shock absorber 76 is an elastic means including a damper 77 and a compressed coil spring (not shown), and is coupled to both sides of the right and left wishbone suspension arms 71 and 72.

The center upper frame 28 is a member in the shape of almost oval, and attached to the upper part thereof is the housing box 22 (refer to FIG. 1) whose bottom is almost the same shape.

The power transmission mechanism 35 of the powertrain unit 17 includes: a belt-driven continuously variable transmission 78 extending from the left rear part of the engine 34 toward the rear, a gearbox 81 as a reduction gear coupled to the rear part of the continuously variable transmission 78, and a drive shaft 74 connected to an output axis located at the front side of the gearbox 81 and a drive shaft 73 connected to an output axis located at the rear side of the gearbox 81.

Figure 5:
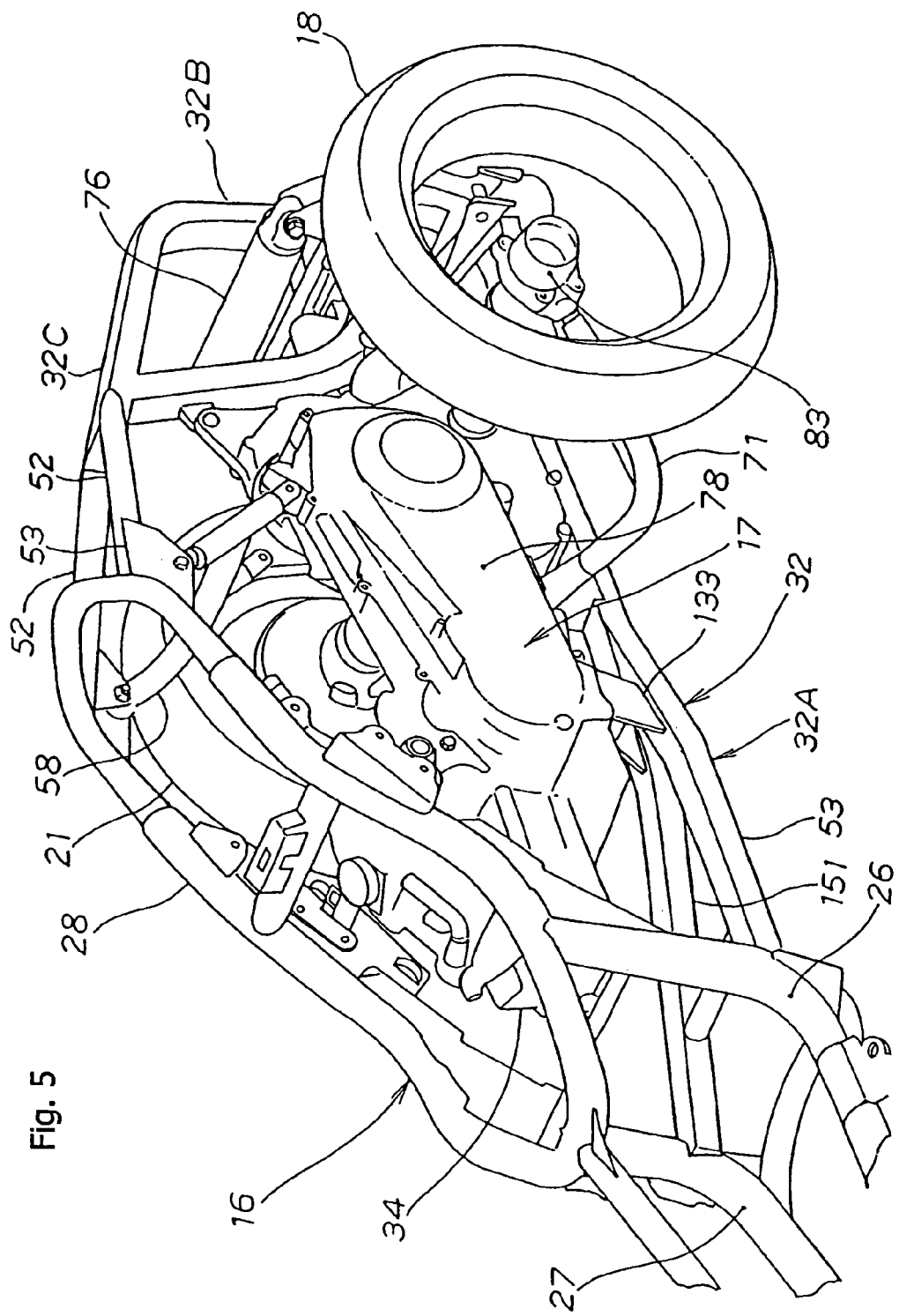
FIG. 5 is a perspective view, partially cut away, of the three-wheeled motor vehicle according to an illustrative embodiment of the present invention.

FIG. 5 is a perspective view of the three-wheeled motor vehicle according to the selected embodiment of the present invention, and shows that the rear parts of the lower pipes 26 and 27 of the main frame cage 16 are attached with the front part of the J frame 32. Herein, numeral 83 denotes a holder (another holder 83 is not shown).

Figure 6:
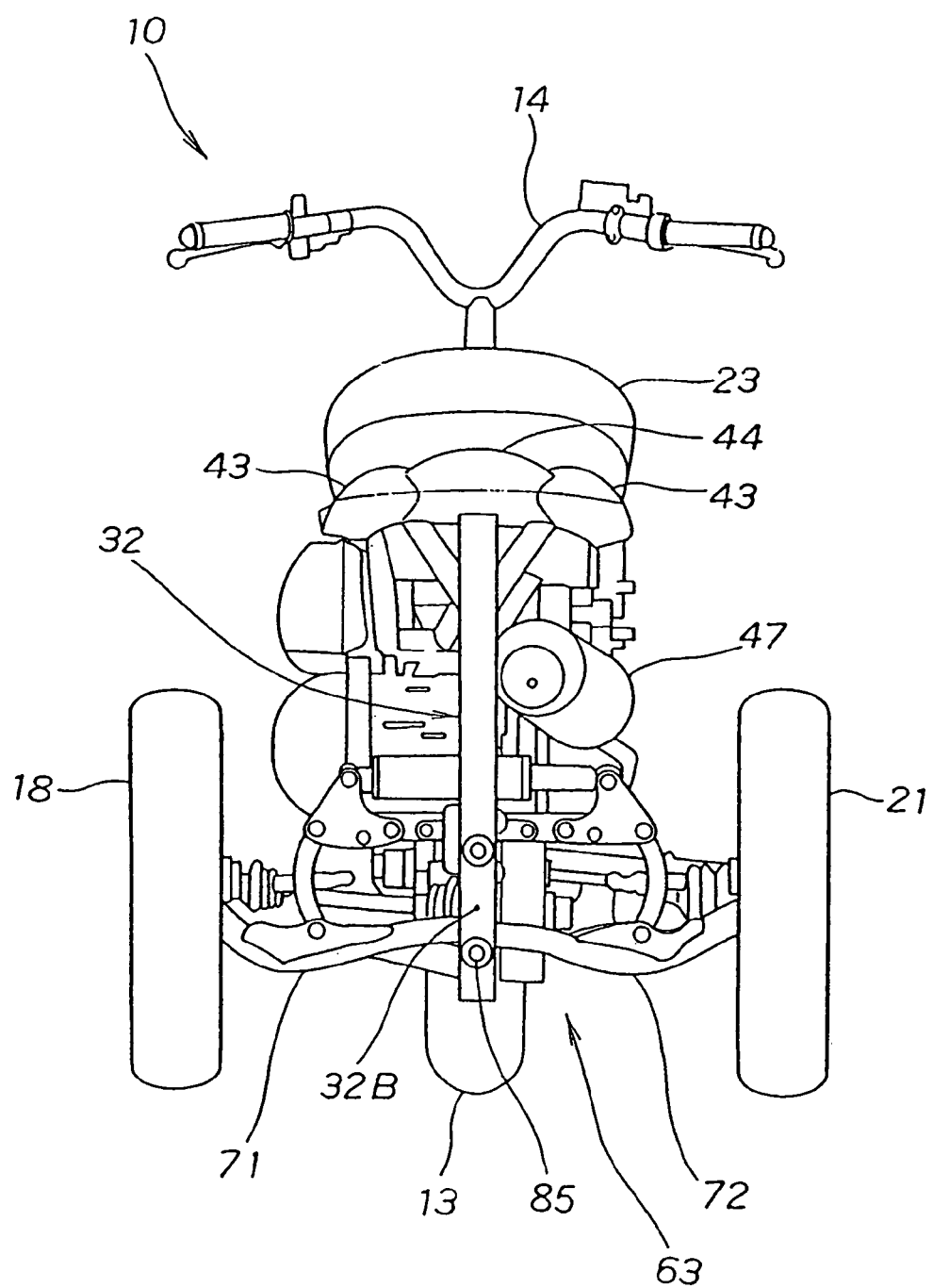
FIG. 6 is a rear elevational view of the three-wheeled motor vehicle according to the illustrative embodiment of the present invention.

FIG. 6 shows a rear plan view of the three-wheeled motor vehicle 10 according to the present invention. As seen in the drawing, the rear end slanting section 32B of the J frame 32 is substantially vertically oriented when nobody is on the three-wheeled motor vehicle 10.

The rear parts of the wishbone suspension arms 71 and 72 are attached to this rear end slanting section 32B. Herein, numeral 85 denotes a rear pivot post for attaching the rear parts of the wishbone suspension arms 71 and 72 to the rear end slanting section 32B, and for pivotal movement of the suspension arms thereon.

Figure 7:
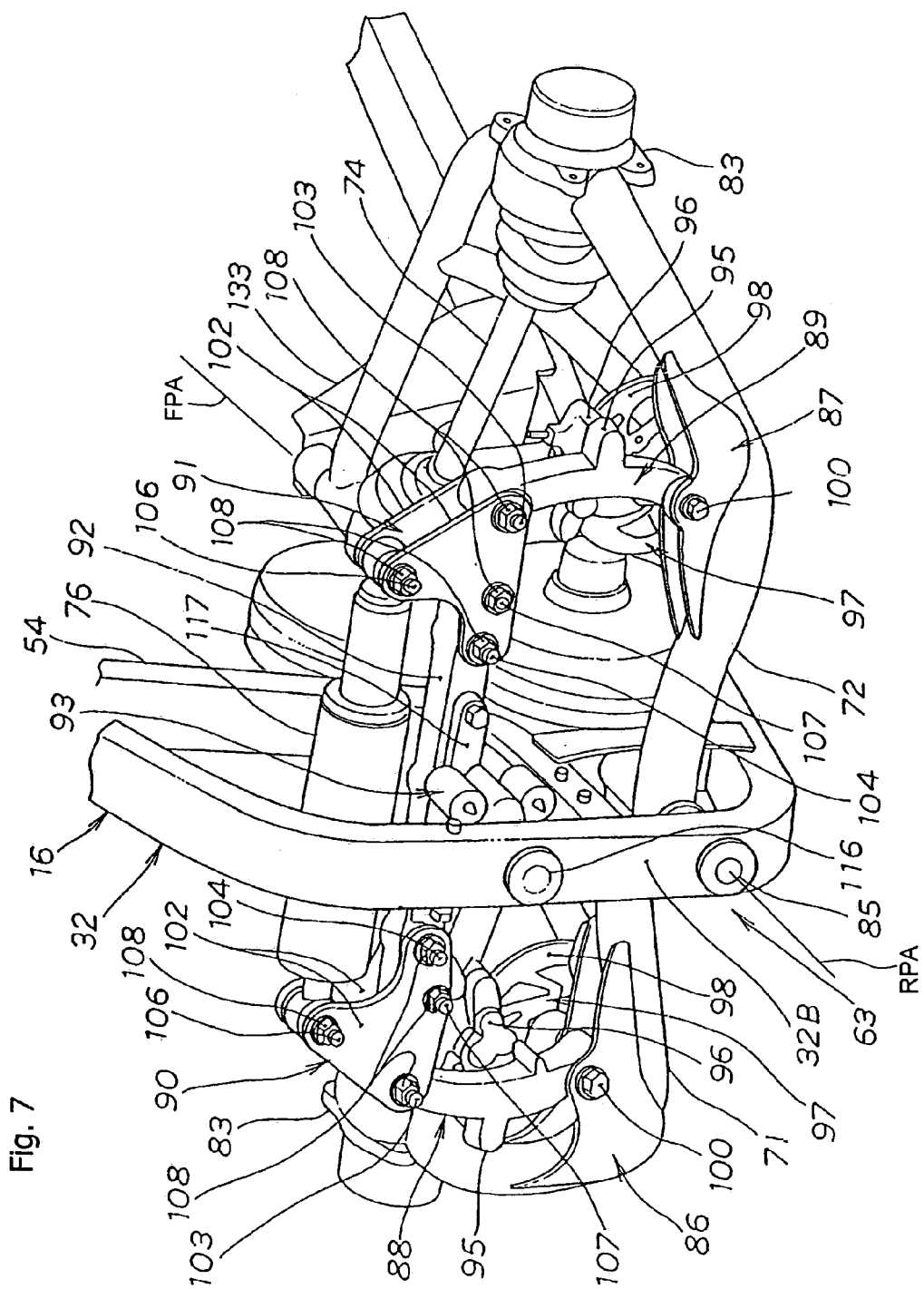
FIG. 7 is a detail perspective view, partially cut away, showing rear drive train and suspension components of the three-wheeled motor vehicle according to the illustrative embodiment of the present invention.

FIG. 7 is a detail perspective view showing part of the rear suspension 63 of the three-wheeled motor vehicle 10 according to the illustrative embodiment of the present invention. A front pivot axis FPA and a rear pivot axis RPA are shown in the drawing, to illustrate how the main frame cage 16 moves relative to the rear wheel support section. In the rear suspension 63, the wishbone suspension arms 71 and 72 are extended to both sides from the J frame 32, and a wheel holder (hub) 83 is attached to the tip end of each wishbone suspension arm 71 and 72.

Arc-shaped reinforcing links 88 and 89 are respectively pivotally attached to the upper parts of the respective wishbone suspension arms 71 and 72, via intermediate attachment brackets 86 and 87 located at the bottom of the links. Respective bell cranks 90 and 91 are pivotally attached to the upper ends of the arc-shaped reinforcing links 88 and 89. The bell cranks 90,91 are formed approximately in the shape of the letter L as viewed from the side, as shown. A hydraulic shock absorber 76 is placed extending across between the upper end parts of the bell cranks 90 and 91, to act as a buffer therebetween.

A rigid connection bar 92 is placed attached to and extending between the side end parts of the bell cranks 90 and 91, and the connection bar 92 is also attached to the rear end slanting section 32B of the J frame 32 via a rocking damper mechanism 93.

The arc-shaped reinforcing links 88 and 89 are each provided, at the center, with a side protruding section 95. The side protruding sections 95 are supportively attached, respectively, to brake calipers 96 and 96, and the arc-shaped reinforcing links 88 and 89 are supported so as to not swing relative to the respective brake disks 98, 98. Herein, 97 and 97 each denote a brake unit including the brake caliper 96 for sandwiching any corresponding brake disk 98 or 98 by the corresponding brake caliper 96 or 96, responding to hydraulic pressure. The brake disks 98 and 98 are respectively attached to the wishbone suspension arms 71 and 72. Numeral 100 denotes a bolt provided to serve as a respective swing axis of the respective arc-shaped reinforcing links 88 and 89.

The bell cranks 90 and 91 are each structured by two substantially identical parallel crank plates 102 and 102. The crank plates 102 of the respective bell cranks 90 and 91 are connected together by a plurality of bolts, including a first bolt 103, a second bolt 104, and a third bolt 106. Here, 107 denotes a fourth bolt serving as a stopper pin for controlling the expansion and contraction of the shock absorber 76, and 108 . . . ( . . . indicates the plural provision, and the same is applicable throughout the present description) denote nuts screwed on to the first to fourth bolts 103 to 107.

The rocking damper mechanism 93 is structured so as to allow the main frame cage 16 to rock in the lateral direction with respect to the wishbone suspension arms 71 and 72 at the time of cornering and other conditions, and as the rocking angle is increased, the countervailing kickback reaction of the damper mechanism 93 is increased with the internal elastic body components, to bias it back toward the original position.

Figure 8A:
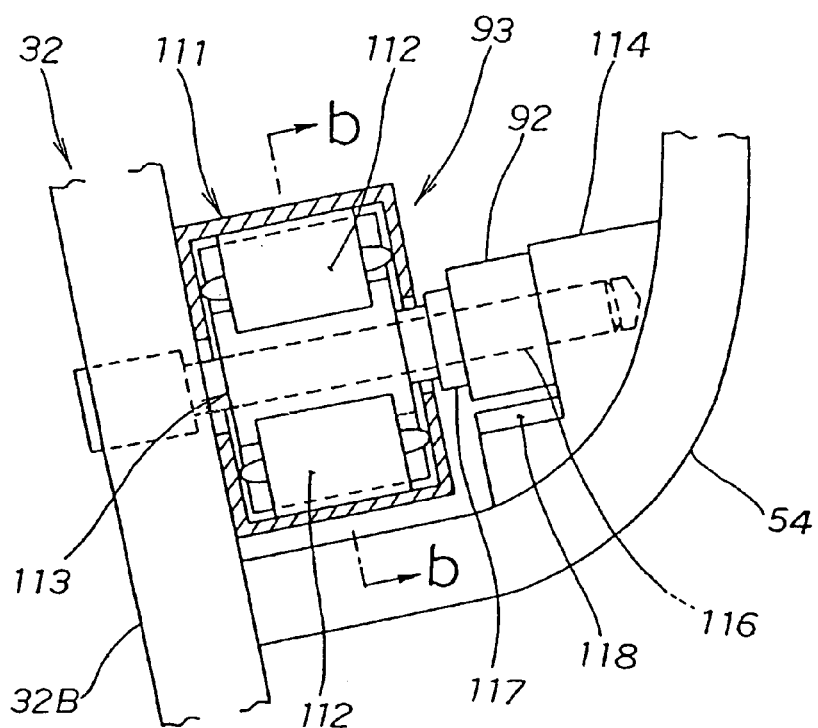
FIGS. 8(a), (b) and (c) are diagrams illustrating a rocking damper mechanism according to an illustrative embodiment of the present invention.
Figures 8B, 8C:
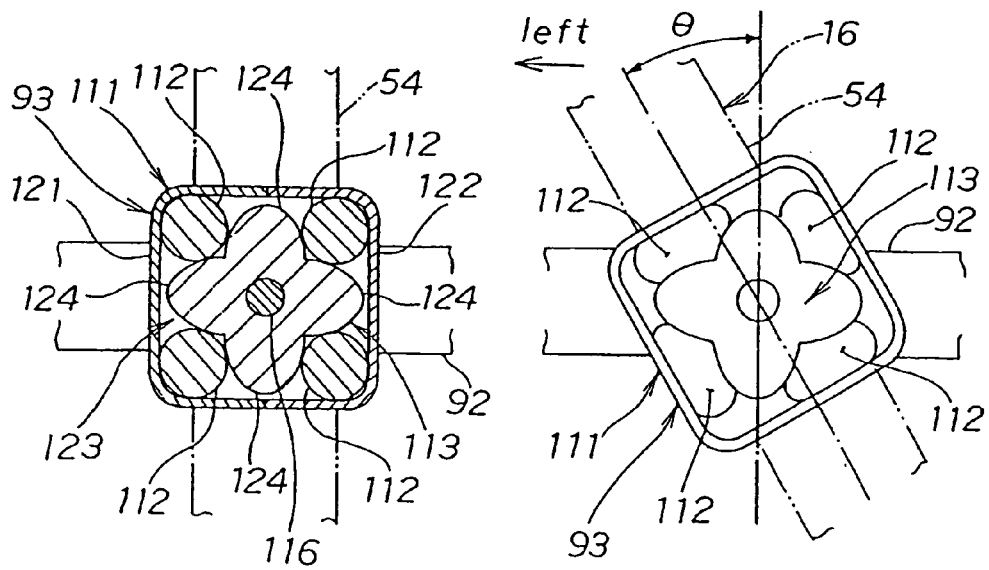

FIGS. 8(a) to 8(c) are all diagrams illustrating the rocking damper mechanism 93 according to the present invention. Specifically, FIG. 8(a) is a side view (partially cross-sectional view), FIG. 8(b) is a cross-sectional view cut along line b—b of FIG. 8(a), and FIG. 8(c) is a diagram showing the effects derived based on the structure shown in FIG. 8(b).

In FIG. 8(a), the rocking damper mechanism 93 is a so-called "Neidhardt damper", structured by a case 111 attached to both the rear end slanting section 32B of the J frame 32 and the rear part of the L pipe 54. The rocking damper mechanism 93 includes a plurality of rubber dampers 112 . . . accommodated in the case 111, and a thrust member 113 attached to the connection bar 92 while capable of applying thrust to these rubber dampers 112.

The rocking damper mechanism 93 also includes a through rod 116, extending through the thrust member 113 and the connection bar 92, and both end parts thereof are supported by a tip support section 114 provided to the L pipe 54 and the rear end slanting section 32B.

Herein, numeral 117 denotes an attachment section provided on the thrust member 113 for attachment of the thrust member 113 to the connection bar 92 using a bolt. 118 denotes a swing control section provided to be a piece with the tip support section 114 for controlling the swing amount of the connection bar 92.

In FIG. 8(b), the case 111 is a combined member of a left case section 121 and a right case section 122. Therein, a damper accommodation chamber 123 is provided, and at four corners of this damper accommodation chamber 123, the rubber dampers 112 . . . are placed, and these rubber dampers 112 . . . are thrusted by convex thrust sections 124 . . . of the thrust member 113.

In FIG. 8(c), the main frame cage 16 rocks toward the left of the vehicle body (arrow left in the drawing denotes left side of the vehicle body) with respect to the connection bar 92 coupled to the side of the suspension arms. Responding to the L pipe 54 tilting by an angle θ, the case 111 of the rocking damper mechanism 93 rotates relative to the thrust member 113. The rubber dampers 112 accommodated in the case 111 are compressed by the case 111, and the thrust member 113 is sandwiched therebetween. Accordingly, the countervailing kickback reaction occurs to push the case 111, and by extension, the main frame cage 16, back toward the original position thereof.

Figure 9:
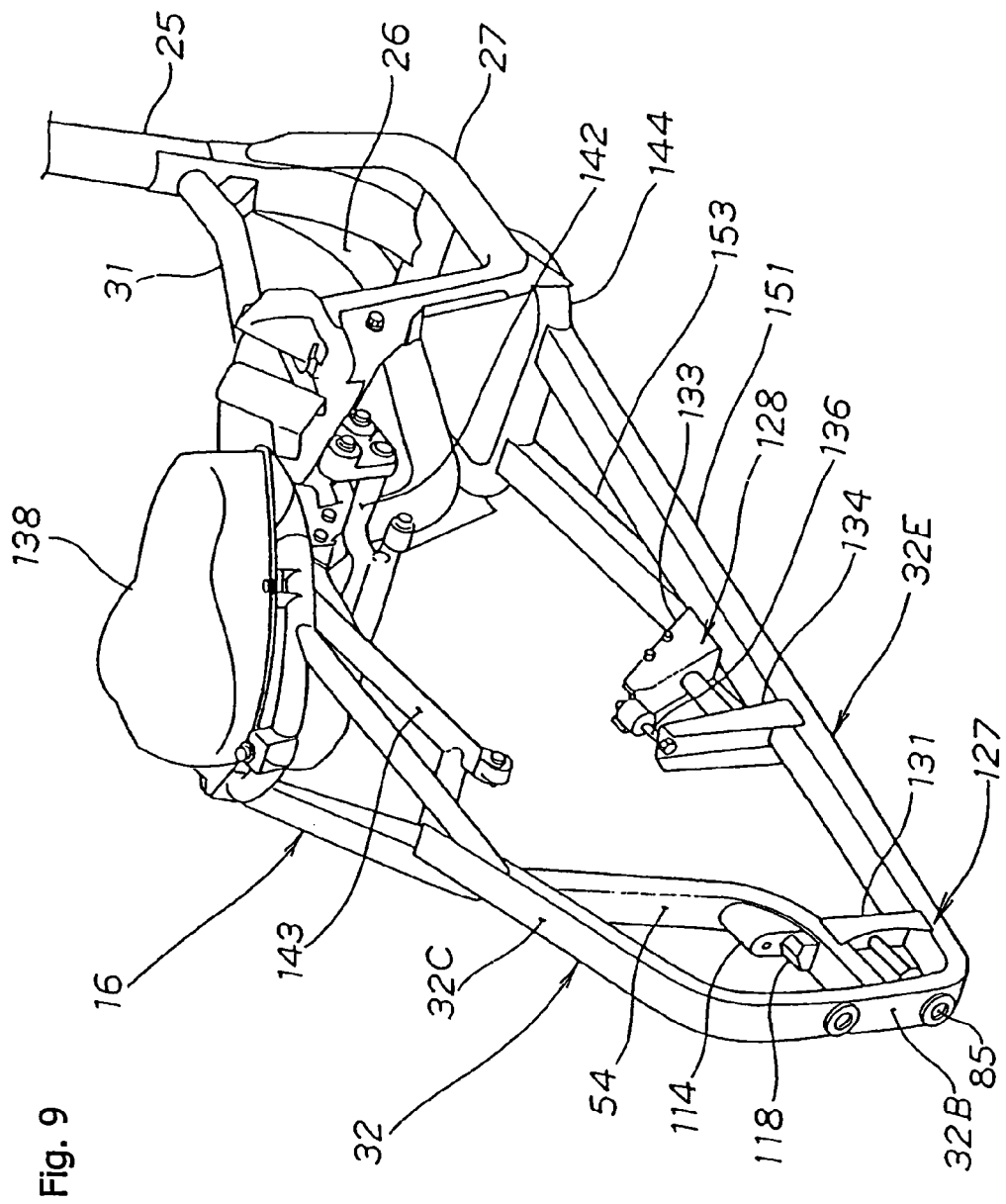
FIG. 9 is a perspective view of a vehicle frame for the three-wheeled motor vehicle according to the illustrative embodiment of the present invention.

FIG. 9 is a perspective view of a frame portion of the three-wheeled motor vehicle 10 of FIG. 1, shown separate from other components of the vehicle. The J frame 32 includes a rear part attachment section 127, provided for pivotally supporting the rear parts of the wishbone suspension arms 71 and 72 thereon (refer also to FIG. 7), and a front part attachment section 128, provided for pivotally supporting the front parts of the wishbone suspension arms 71 and 72 thereon.

The rear part attachment section 127 includes the rear end slanting section 32B, and a vertical bracket 131 provided vertically from the L pipe 54 to a lower part horizontal section 32E (will be described later). The rear pivot post 85 is attached to each of the rear part slanting section 32B and the vertical bracket 131, for supporting the rear parts of the wishbone suspension arms 71 and 72.

The front part attachment section 128 includes an angled front brace 133 and a substantially vertical rear brace 134, each attached to and extending upwardly from the lower part horizontal section 32E with some interval therebetween. A front pivot post 136 is attached to and extends between the front brace 133 and the rear brace 134, for supporting the front parts of the wishbone suspension arms 71 and 72.

The front pivot post 136 and the rear pivot post 85 described above function both as swing axes of the wishbone suspension arms 71 and 72, and as rocking axes of the main frame cage 16.

Here, 138 denotes a fuel tank, and 144 denotes a U-shaped pipe attached to the lower rear parts of the lower pipes 26 and 27, for attaching the tip of the lower part horizontal section 32E of the J frame 32.

FIG. 5 shows the embodiment in which the front end of the lower part horizontal section 32A, bifurcated into Y-shape, is directly attached to the lower pipes 26 and 27. Another embodiment is shown in FIG. 9, in which the J frame 32 includes the lower part horizontal section 32E bifurcated into Y-shape, the rear end slanting section 32B, and the upper part slanting section 32C. The front end of the lower part horizontal section 32E is attached to the lower pipes 26 and 27 via the U pipe 144, or an engine attachment section in the main frame cage 16 is structured as engine mount vibration isolation links 142 and 143.

Figure 10:
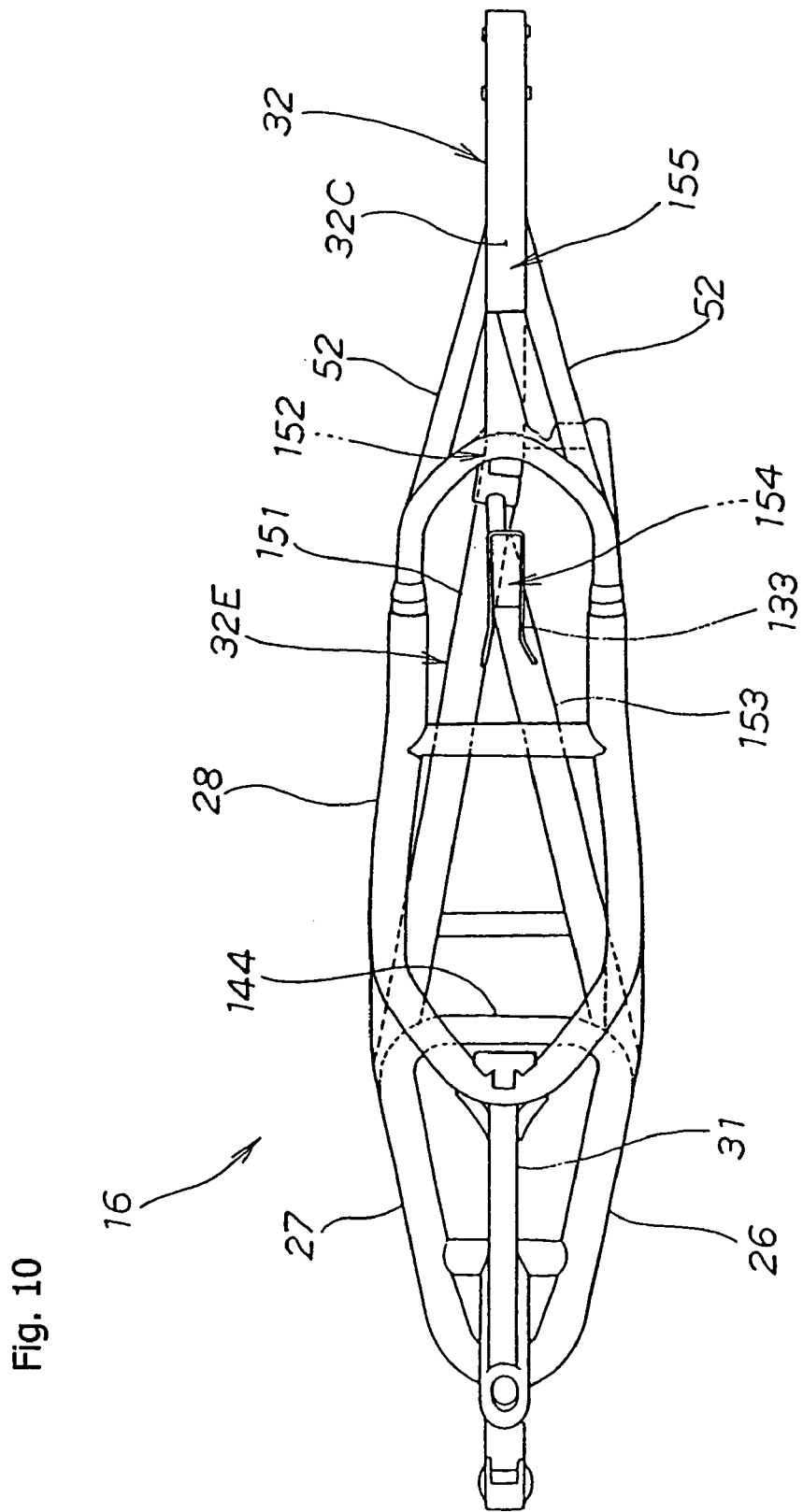
FIG. 10 is a top plan view of a main frame cage according to an illustrative embodiment of the present invention.

FIG. 10 is a top plan view of the main frame cage according to the present invention. Shown therein is the J frame 32 in which the lower part horizontal section 32E is bifurcated into Y-shape at some point thereof to couple to the rear part of the U pipe 144, and the coupling pipes 52 and 52 are extended, in a Y shape, from the upper part slanting section 32C of the J frame 32 to the center upper frame 28.

The lower part horizontal section 32E (and lower part horizontal section 32A (refer to FIG. 5)) is a part, in detail, formed by bending a long first pipe 151 at some point thereof, and in the vicinity of the resulting bending part 152 of the first pipe 151, a second pipe 153 is connected. Here, 154 denotes a Y bifurcation section bifurcated into Y-shape through connection between the first pipe 151 and the second pipe 153, and 155 denotes another Y bifurcation section bifurcated into Y-shape through connection between the upper part slanting section 32C and the coupling pipes 52 and 52.

The first pipe 151 is a member including the rear end slanting section 32B and the upper part slanting section 32C, and is the one derived by excluding the second pipe 153 from the J frame 32.

As such, by forming the lower part horizontal section 32E in the shape of Y, coupling between the lower front part of the J frame 32 and the U pipe 144 can be securely fastened. And by placing the coupling pipes 52 and 52 in the shape of Y, coupling between the rear upper part of the J frame 32 and the rear part of the center upper frame 28 can be securely fastened. Further, in FIG. 5, by shaping the lower part horizontal section 32A in the Y shape, coupling between the lower front part of the J frame 32 and the lower pipes 26 and 27 can be securely fastened.

Figure 11:
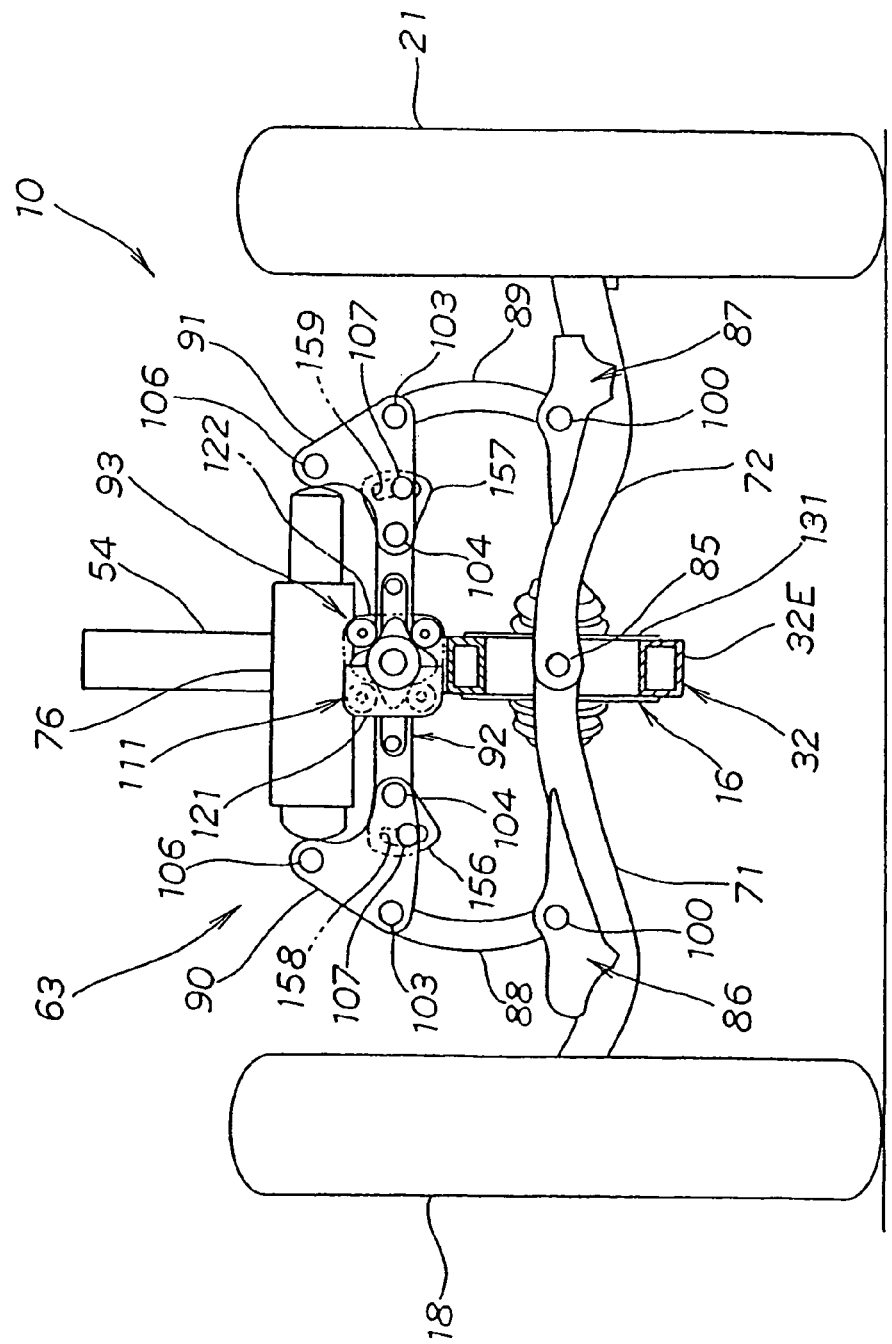
FIG. 11 is a rear elevational view of a rear suspension according to an illustrative embodiment of the present invention.

FIG. 11 is a rear view of the rear suspension according to the present invention, and shown therein is the rear suspension 63 on which a passenger (driver) is sitting (such a state is referred to "1G state"). Herein, the rear end slanting section 32B and the upper part slanting section 32C in the J frame 32 of FIG. 9 are not shown. Further, the right case 122 of the rocking damper mechanism 93 of FIG. 8(b) is indicated by imaginary lines. In such a case, the L pipe 54 of the main frame cage 16 is almost vertical, and the connection bar 92 is almost horizontal.

The connection bar 92 is a member including, at both ends, fan-shaped sections 156 and 157 both being in the shape of fan, and these fan-shaped sections 156 and 157 are formed with arc-shaped long holes 158 and 159, respectively. Through these arc-shaped long holes 158 and 159, fourth bolts 107 and 107 serving as stopper pins are each inserted, thereby controlling the tilting angle of the bell cranks 90 and 91 with respect to the connection bar 92. The tilting angle of the bell cranks 90 and 91 changes depending on the tilting angle of the wishbone suspension arms 71 and 72, i.e., how much the rear wheels 18 and 21 move in the vertical direction. In other words, the arc-shaped long holes 158 and 159 are parts with which the rear wheels 18 and 21 are restricted to move in the vertical direction.

Figure 12:
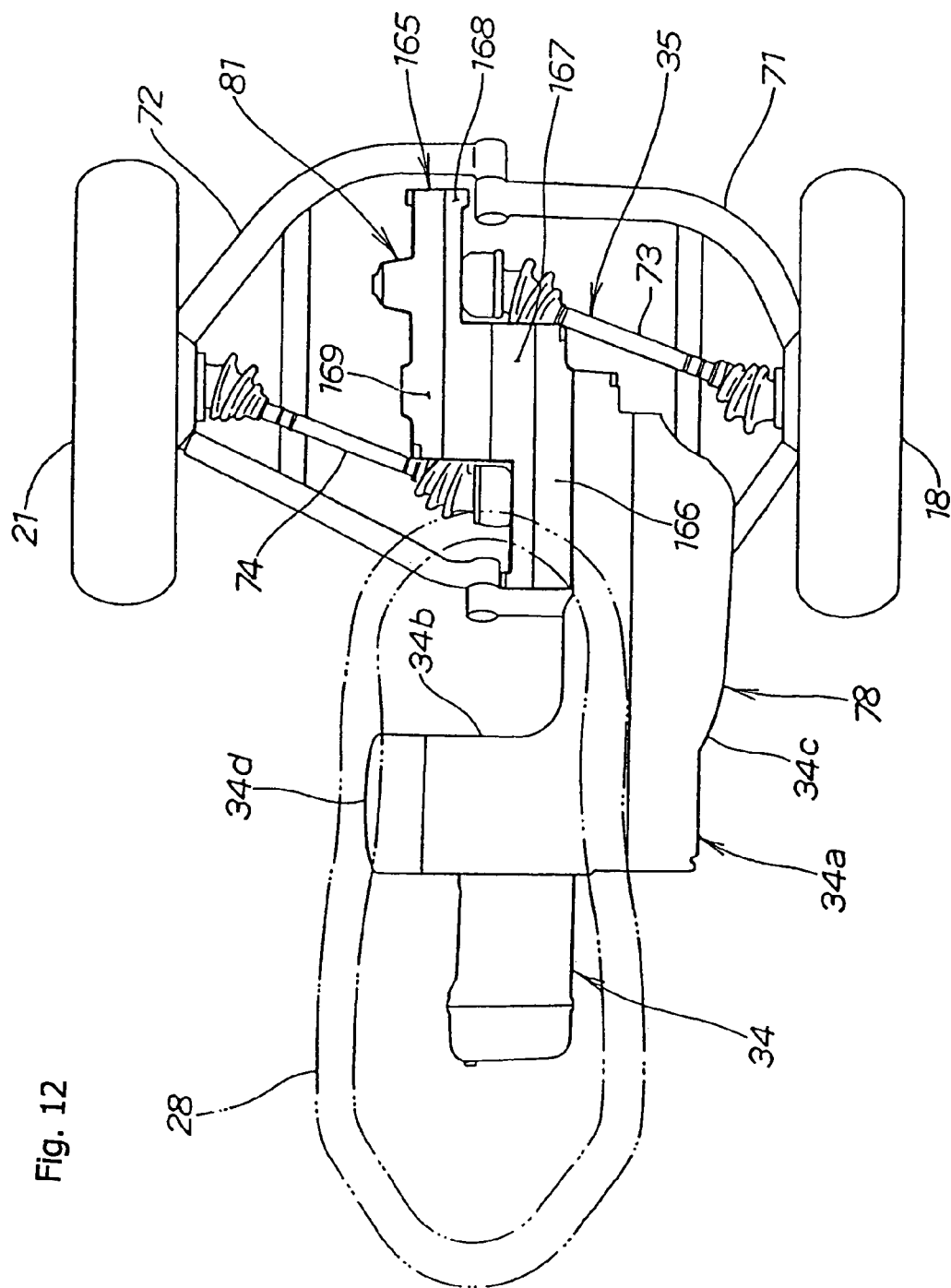
FIG. 12 is a top plan view showing the main part of a power transmission mechanism according to an illustrative embodiment of the present invention.

FIG. 12 is a plan view showing the main part of the power transmission mechanism according to the present invention. Shown therein is the power transmission mechanism 35 in which the rear part of a crankcase 34a of the engine 34 accommodates the continuously variable transmission 78, and at the rear part of the crankcase 34a, the gearbox 81 is attached separately from the crankcase 34a.

The crankcase 34a includes a case body 34b, a transmission cover 34c covering the left side of the case body 34b, and a right cover 34d covering the right side of the case body 34b.

The gearbox 81 includes a gear case 165 for accommodating a plurality of gears, and the gear case 165 includes first to fourth cases 166 to 169.

Figure 13:
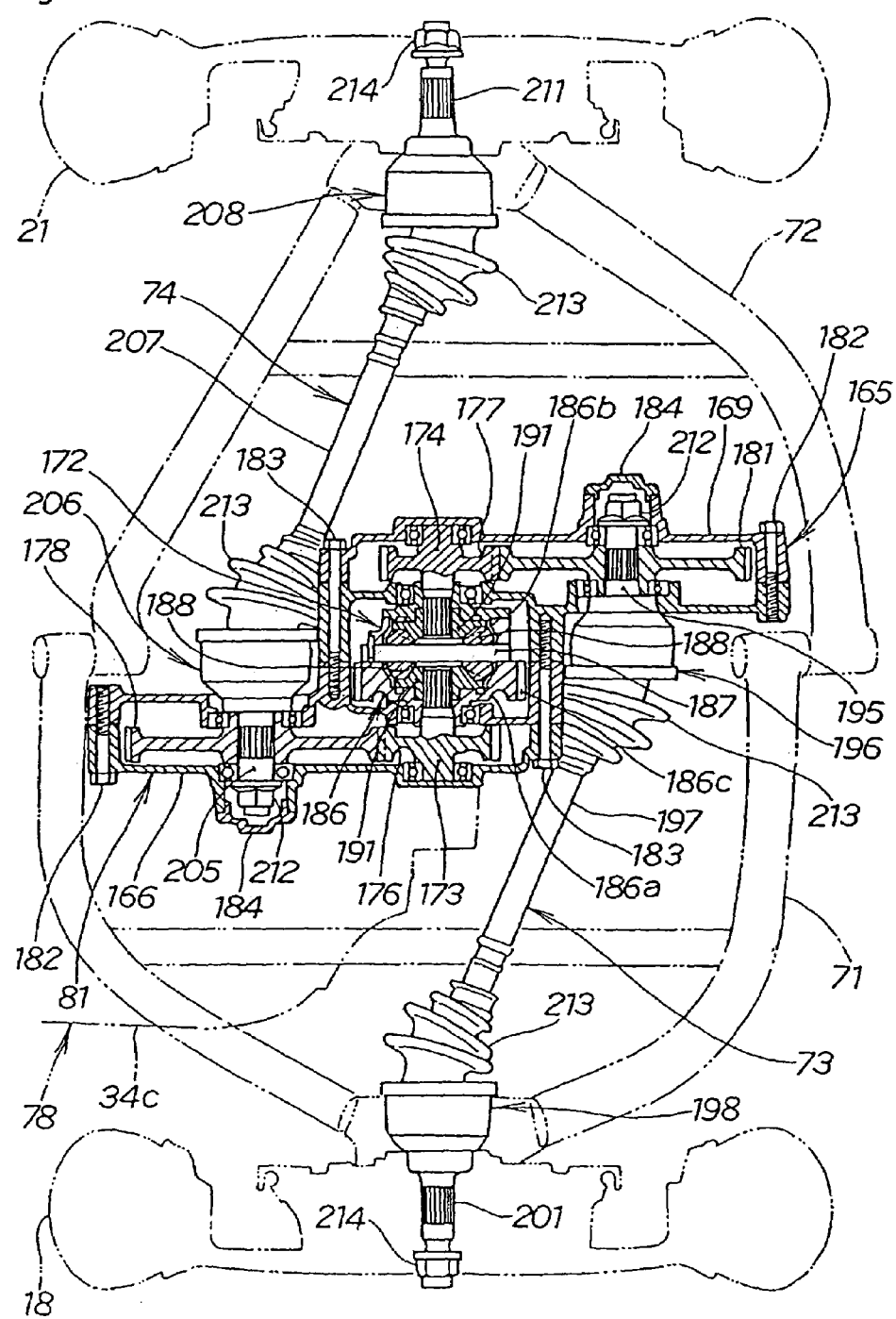
FIG. 13 is a cross-sectional view illustrating a gearbox according to an illustrative embodiment of the present invention.

FIG. 13 is a cross-sectional view illustrating the gearbox according to the present invention. The gearbox 81 is provided with: a differential mechanism 172, a first left gear 176 and a first right gear 177 formed to be a piece with, respectively, a left differential axis 173 and a right differential axis 174 both being an output of the differential mechanism 172; a second left gear 178 and a second right gear 181 engaged with the first left gear 176 and the first right gear 177, respectively; the above-described gear case 165; a plurality of bearings; and bolts 182 . . . and 183 . . . used for coupling the cases of the gear case 165. Herein, 184 and 184 each denote a cap closing the opening aperture of the first case 166 and the fourth case 169.

The differential mechanism 172 includes: a case 186, a pin 187 as a differential pinion axis attached to the case 186; a pair of first bevel gears 188 and 188 both attached to the pin 187 to be rotatable; a pair of second bevel gears 191 and 191 engaged respectively with these first bevel gears 188 and 188; and the above-described left differential axis 173 and right differential axis 174 establishing spline coupling with these second bevel gears 191 and 191.

The case 186 includes a case body section 186a, and a case cover section 186b closing the opening aperture of the case body section 186a. To the case body section 186a, provided is a large-diameter gear 186c for receiving the power from the side of the continuously variable transmission 78. The case body section accommodates the first bevel gears 188 and 188, and the second bevel gears 191 and 191.

The drive shaft 73 includes: an internal shaft 195 as an output axis establishing spline coupling with the second right gear 181; a center shaft 197 coupled to the internal shaft 195 via a constant velocity joint 196; and an external shaft 201 being coupled to the tip of the center shaft 197 via the constant velocity joint 198, and establishing spline coupling with the hub on the side of the rear wheel 18.

The drive shaft 74 includes: an internal shaft 205 as an output axis establishing spline coupling with the second left gear 178; a center shaft 207 coupled to the internal shaft 205 via a constant velocity joint 206; and an external shaft 211 being coupled to the tip of the center shaft 207 via the constant velocity joint 208, and establishing spline coupling with the hub on the side of the rear wheel 21. Herein, 212 and 212 both denote a nut for fixing the internal shafts 195 and 205 to the second left gear 178 and the second right gear 181, respectively; 213 . . . each denote a rubber boot covering the constant velocity joints 196, 198, 206, and 208; and 214 and 214 both denote a nut for fixing the external shafts 201 and 211 to the hub.

The internal shaft 195 of the above-described drive shaft 73 is a left output axis of the gearbox 81, and the internal shaft 205 of the drive shaft 74 is a right output axis of the gearbox 81.

As such, in the present invention, the internal shafts 195 and 205 as the right and left output axes of the gearbox 81 are so provided as to be spaced apart from each other in the fore and aft direction of the vehicle body.

Figure 14:
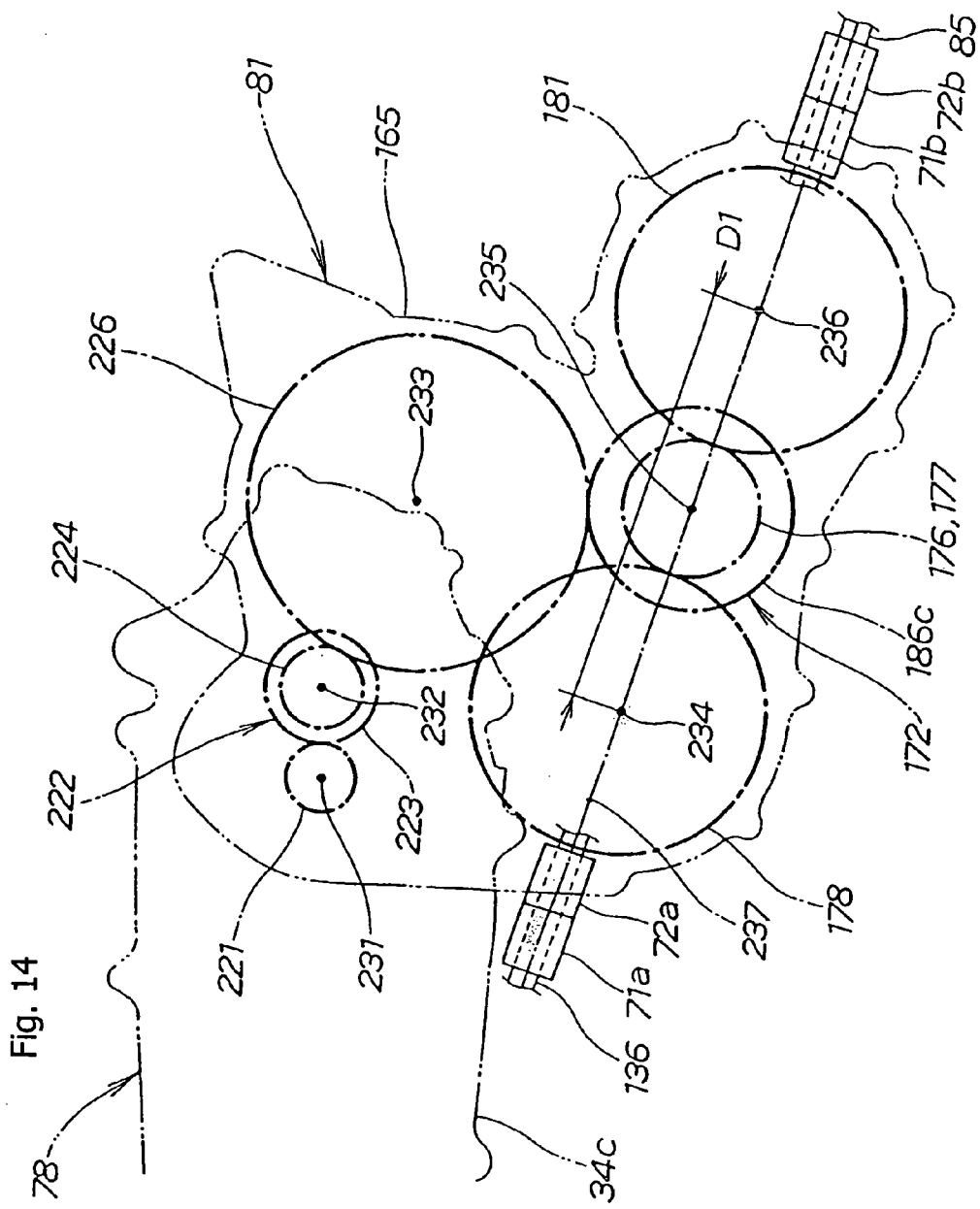
FIG. 14 is a simplified side view showing the gear train of the gearbox of FIG. 13.

FIG. 14 is a side view of a gear train of the gearbox according to the present invention. Therein, a driving gear 221 is attached to a follower pulley axis of the belt-driven continuously variable transmission 78, the driving gear 221 is engaged with a large gear 223 being a part of a reduction gear 222, a transmission gear 226 is engaged with a small gear 224 being a unit with the large gear 223, the transmission gear 226 is engaged with the large-diameter gear 186c of the differential mechanism 172, the second left gear 178 is engaged with the first left gear 176 of the left differential axis 173 (refer to FIG. 13) coaxial to the large-diameter gear 186c, the second right gear 181 is engaged with the first right gear 177 of the right differential axis 174 (refer to FIG. 13) coaxial also to the large-diameter gear 186c, the differential mechanism 172, specifically, the first left gear 176 and the first right gear 177 are located below to the continuously variable transmission 78. Herein, 231 to 236 each indicate the rotation center of the respective gears, and the distance between the rotation centers 234 and 236 is presumably D1.

FIG. 14 also shows that the rotation centers 234, 235, and 236 are located on a straight line 237, and on this straight line 237, the front pivot post 136 and the rear pivot post 85 are placed. The front pivot post 136 is attached, to be rotatable, with the front part attachment sections 71a and 72a of the wishbone suspension arms 71 and 72, respectively. The rear pivot post 85 is attached, to be rotatable, with the rear part attachment sections 71b and 72b of the wishbone suspension arms 71 and 72, respectively.

That is, in the front and rear of the differential mechanism 172, placed are the front part attachment sections 71a and 72a and the rear part attachment sections 71b and 72b of the wishbone suspension arms 71 and 72.

The above-described straight line 237 is a swing axis of the wishbone suspension arms 71 and 72 of FIG. 11, and also a rocking axis of the vehicle body 16.

Figure 15:
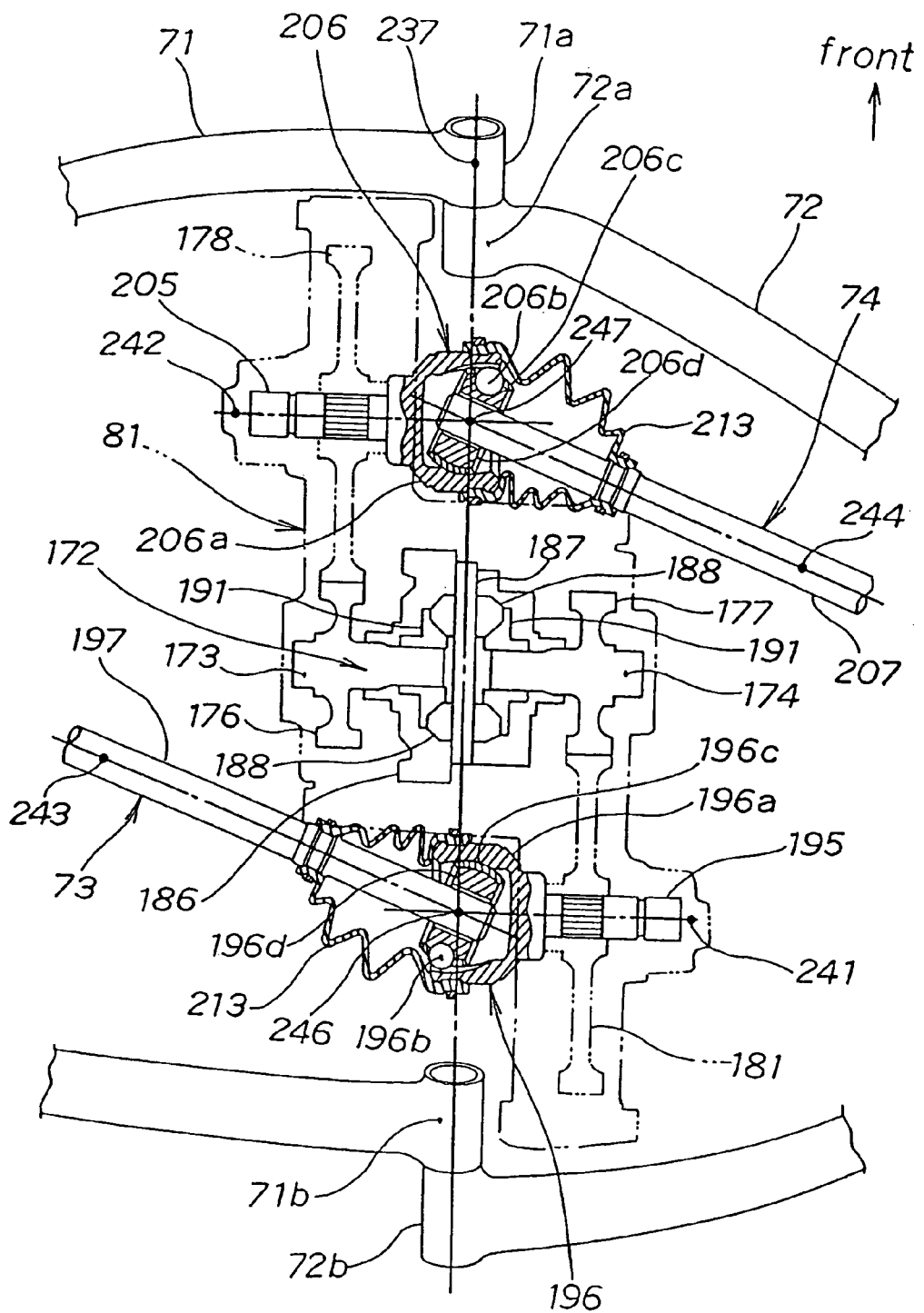
FIG. 15 is a top plan view showing the main part of the axial placement of the power transmission mechanism according to an illustrative embodiment of the present invention.

FIG. 15 is a plan view mainly showing the axial placement in the power transmission mechanism according to the present invention. Illustrated therein are the internal shafts 195 and 205 as right and left output axes of the gearbox 81, and the pivoting parts of the drive shafts 73 and 74, and the swing axes of the wishbone suspension arms 71 and 72. Herein, an arrow (front) in the drawing indicates the front of the vehicle.

Assuming that the axial lines of the internal shafts 195 and 205 are axial lines 241 and 242, the axial lines of the center shafts 197 and 207 are axial lines 243 and 244, the axial line of the internal shaft 195 intersects with the axial line 243 of the center shaft 197 at an intersection point 246, and the axial line 242 of the internal shaft 205 intersects with the axial line 244 of the center shaft 207 at an intersection point 247, those intersection points 246 and 247 intersect with the swing axes of the wishbone suspension arms 71 and 72, and the straight line 237 being a rocking axis of the main frame cage 16 (refer to FIG. 11).

Such intersection points 246 and 247 are also pivoting parts of the constant velocity joints 196 and 206.

Here, in the constant velocity joints 196 and 206, 196a and 206a denote outer rings formed to be a unit with the internal shafts 195 and 205, respectively, 196b . . . and 206b . . . (the drawing shows only one of each) denote balls movable in the groove provided to the inner planes of the outer rings 196a and 206a, respectively, 196c and 206c denote cages for retaining therein the balls 196b . . . and 206b . . . not to loosen, and 196d and 206d both denote internal rings being fit to the inner planes of the cages 196c and 206c, allowing spline engagement at the tips of the center shafts 197 and 207, and having concave parts for the balls 196b and 206b fit therein.

As such, by placing the pivoting parts of the constant velocity joints 196 and 206 on the straight line 237, in the drive shafts 73 and 74, only the internal shafts 195 and 205 rock together with the gearbox 81 but not the center shafts 197 and 207 and the external shafts 201 and 211 (refer to FIG. 13) when the main frame cage 16 rocks in the lateral direction. That is, this prevents the drive shafts 73 and 74 from displacing.

By referring to FIG. 23, an exemplary comparison case is described where the pivoting part of the constant velocity joint is not placed on the swing axis of the suspension arms (or on the rocking axis of the main frame cage).

FIG. 15 also shows that the pin 187 serving as the differential pinion axis structuring the differential mechanism 172 passes through the above-described straight line. The pin 187 is the one placed in the center of the differential mechanism 172, and by extension, is the one placed in the center of the gearbox 81. In other words, the differential mechanism 172 is placed on the straight line 237, and by extension, the gearbox 81 is placed on the straight line.

Accordingly, even if the differential mechanism 172 weighing a lot among the constituents of the gearbox 81 rocks together with the main frame cage 16 about the straight line 237, the mobility of the three-wheeled motor vehicle 10 with the rocking mechanism can be improved to a greater degree. This is because the inertial moment of the differential mechanism 172 about the straight line 237 being the rotation axis can be reduced (and the inertial moment of the gearbox 81 can be reduced), and the three-wheeled motor vehicle 10 with the rocking mechanism (refer to FIG. 1) can make a turn with a quick motion by rocking to the left or right.

The operation and effects of the rear suspension 63 are now described.

Figure 16:
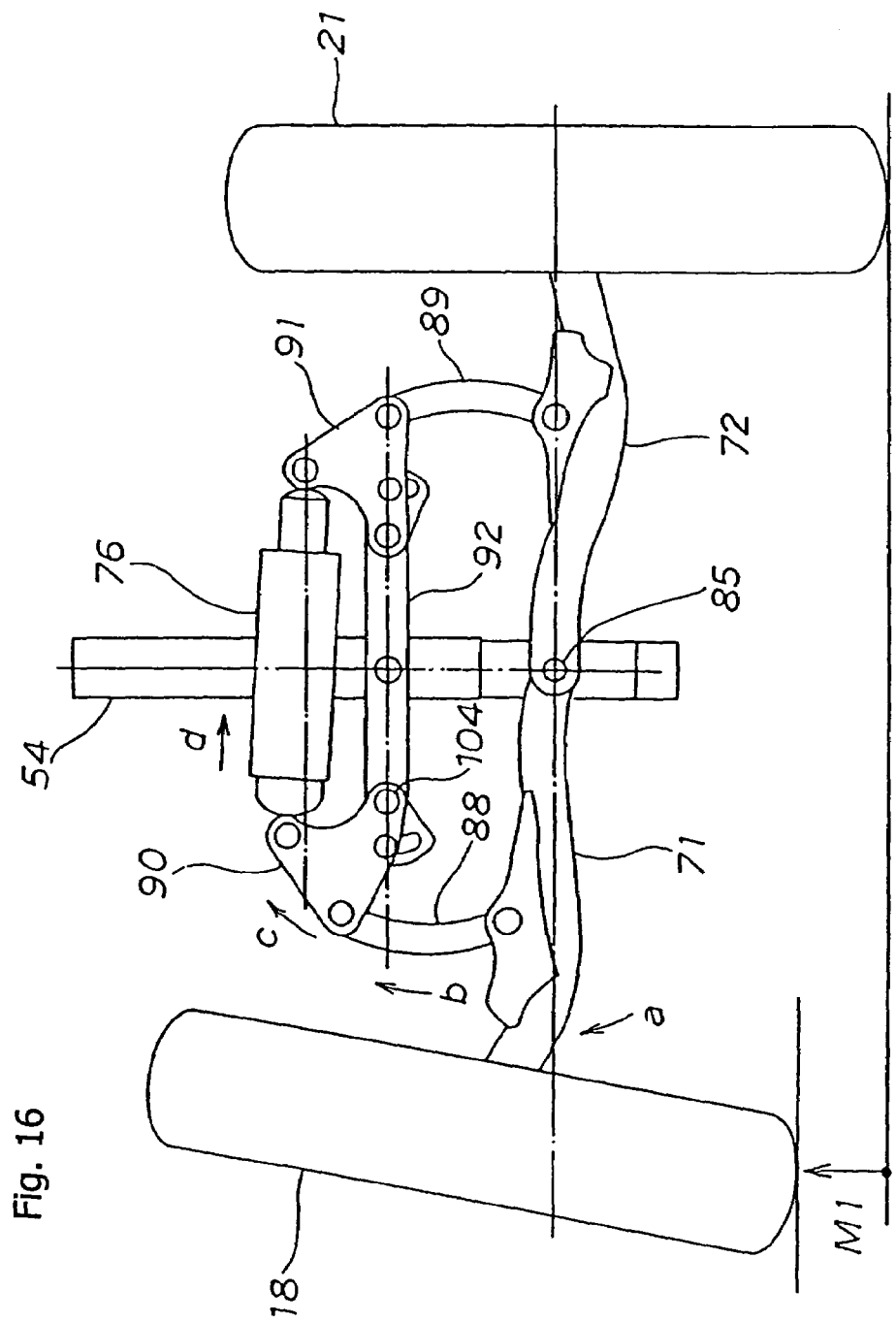
FIG. 16 is a first rear elevational rear elevational effect view showing the effects achieved by the rear suspension according to an illustrative embodiment of the present invention.

FIG. 16 is a first effect diagram showing the effects achieved by the rear suspension according to the present invention.

For example, if the left rear wheel 18 moves upward by an amount of motion M1 from the state shown in FIG. 11, the wishbone suspension arm 71 accordingly swings upward as indicated by an arrow a about the rear pivot post 85 and the front pivot post 136 (refer to FIG. 9), and responding thereto, the arc-shaped reinforcing link 88 moves upward as an arrow b. This causes the bell crank 90 to swing in the direction of arrow c with the second bolt 104 serving as a fulcrum, whereby the shock absorber 76 is compressed as an arrow d. In such a manner, impact resulting from rising of the left rear wheel 18 to the side of the main frame cage 16 (refer to FIG. 10) is lessened.

At this time, the other suspension arm 72 is in the same state as that of FIG. 11, thus the connection bar 92 is almost horizontal similarly to FIG. 11.

Figure 17:
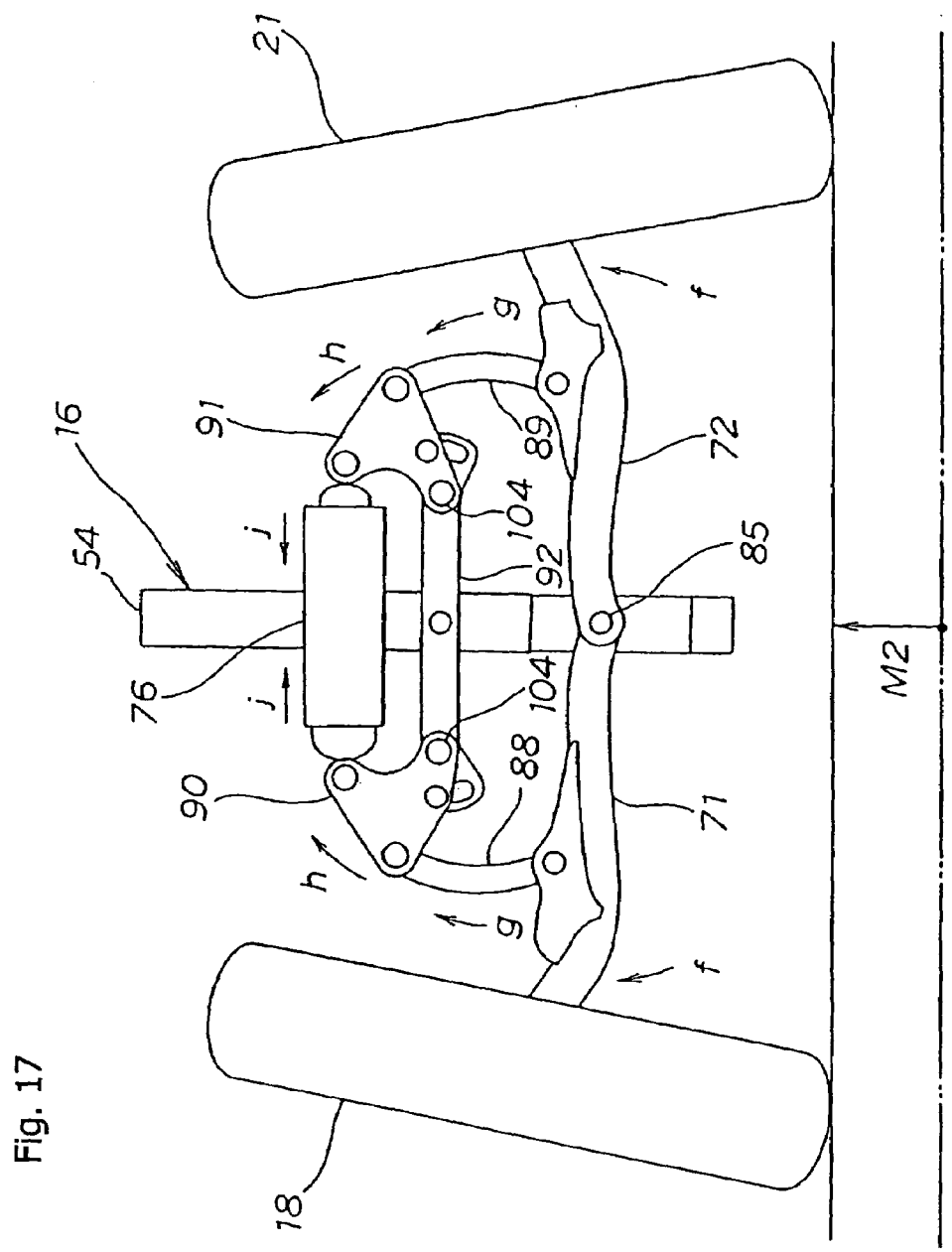
FIG. 17 is a second rear elevational effect view showing the effects achieved by the rear suspension according to an illustrative embodiment of the present invention.

FIG. 17 is a second effect diagram showing the effects achieved by the rear suspension according to the present invention.

From the state of FIG. 11, the rear wheels 18 and 21 both move upward by an amount of motion M2. Or, if the main frame cage 16 moves downward with respect to the rear wheels 18 and 21 by the amount of motion M2, the wishbone suspension arms 71 and 72 both swing upward as arrows f and f about the rear pivot post 85 and the front pivot post 136 (refer to FIG. 9). In response thereto, the arc-shaped reinforcing links 88 and 89 move upward as arrows g and g. This causes the bell cranks 90 and 91 to swing in the direction of arrows h and h with the second bolt 104 serving as a fulcrum, whereby the shock absorber 76 is compressed as arrows j and j. In such a manner, buffering effects can be provided by the shock absorber 76.

Figure 18:
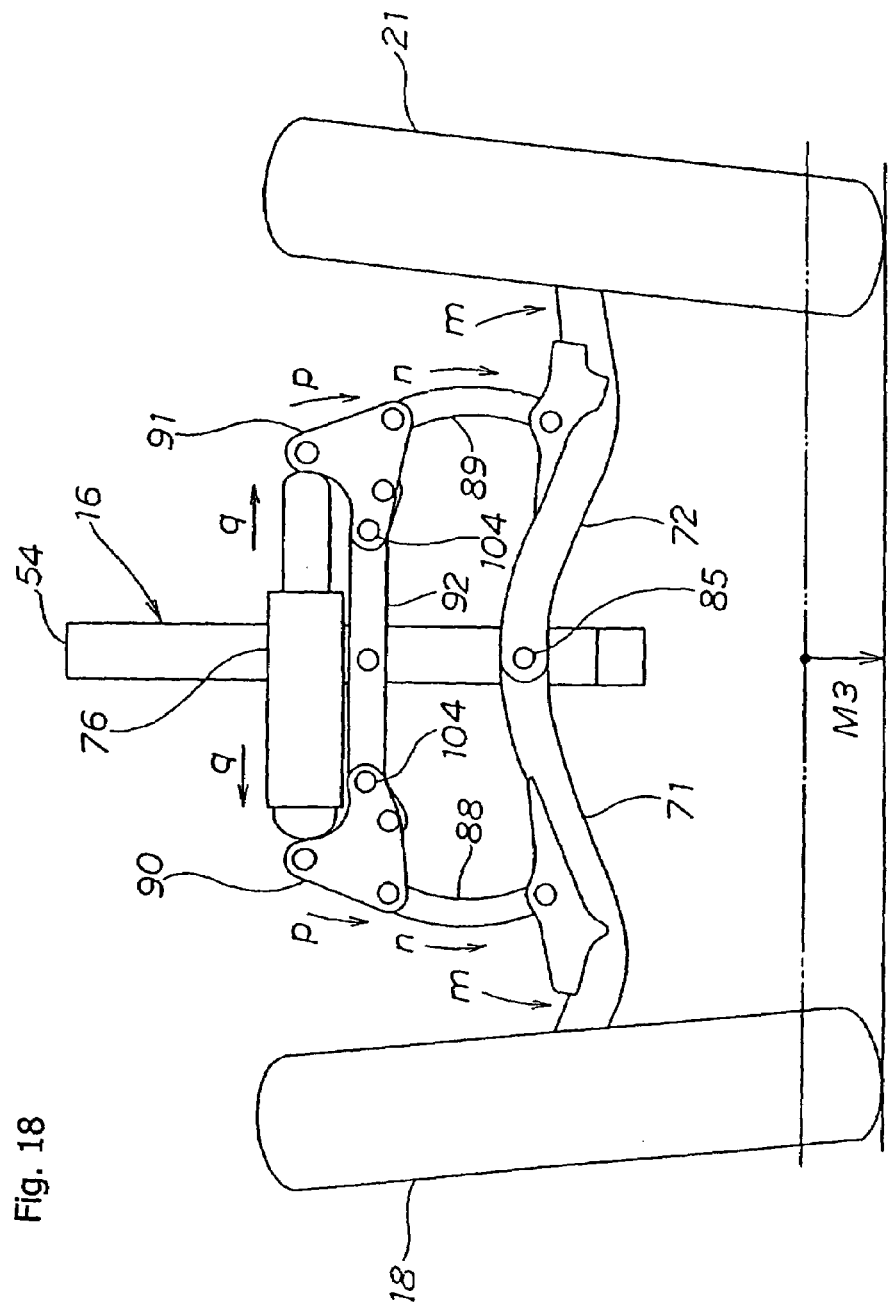
FIG. 18 is a third rear elevational effect view showing the effects achieved by the rear suspension according to an illustrative embodiment of the present invention.

FIG. 18 is a third effect diagram showing the effects achieved by the rear suspension according to the present invention.

From the state of FIG. 11, the rear wheels 18 and 21 both move downward by an amount of motion M3. Or, if the main frame cage 16 moves upward with respect to the rear wheels 18 and 21 by the amount of motion M3, the wishbone suspension arms 71 and 72 both swing downward as arrows m and m about the rear pivot post 85 and the front pivot post 136 (refer to FIG. 9). In response thereto, the arc-shaped reinforcing links 88 and 89 accordingly move downward as arrows n and n. This causes the bell cranks 90 and 91 to swing in the direction of arrows p and p with the second bolt 104 serving as a fulcrum, whereby the shock absorber 76 is extended as arrows q and q. In such a manner, buffering effects can be provided by the shock absorber 76.

Figure 19:
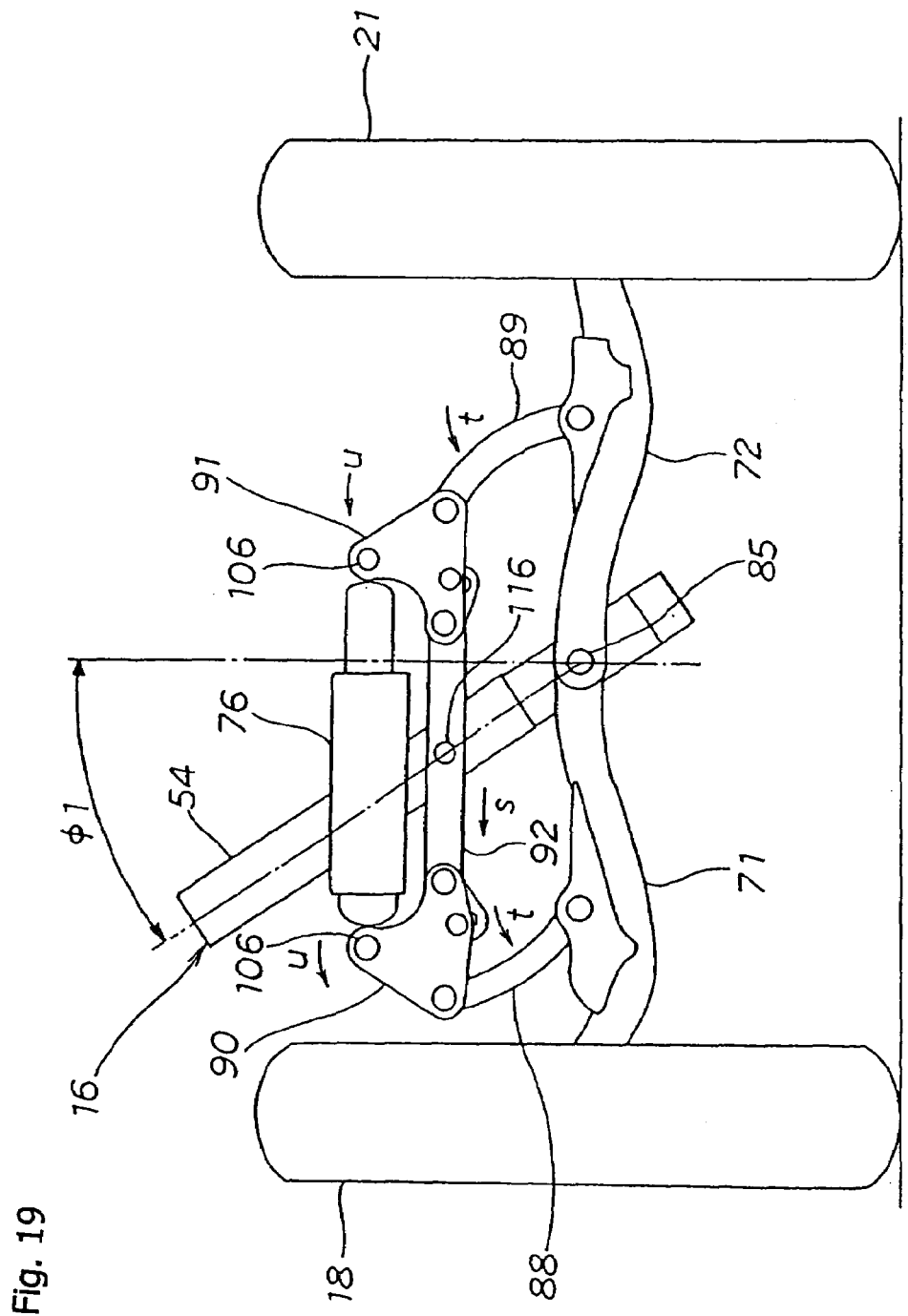
FIG. 19 is a fourth rear elevational effect view showing the effects achieved by the rear suspension according to an illustrative embodiment of the present invention.

FIG. 19 is a fourth effect diagram showing the effects achieved by the rear suspension according to the present invention.

From the state of FIG. 11, when the main frame cage 16, in this example, the L pipe 54 rocks towards the left of the vehicle body by an angle of $\phi1$, the connection bar 92 coupled to the L pipe 54 using the through rod 116 moves horizontally toward the left as indicated by an arrow s. In response thereto, the arc-shaped reinforcing links 88 and 89 both tilt as indicated by arrows t and t, and the bell cranks both move horizontally in the direction of arrows u and u. Here, the distance between the third bolts 106 and 106 of the bell cranks 90 and 91 shows no change, thus the buffer does not expand nor contract.

At this time, the main frame cage 16 rocks with respect to the connection bar 92. Thus, similarly to the case of FIG. 8(c), the kickback reaction occurs by the rocking mechanism to put the main frame cage 16 back to its original position (that is, position of FIG. 11).

Figure 20:
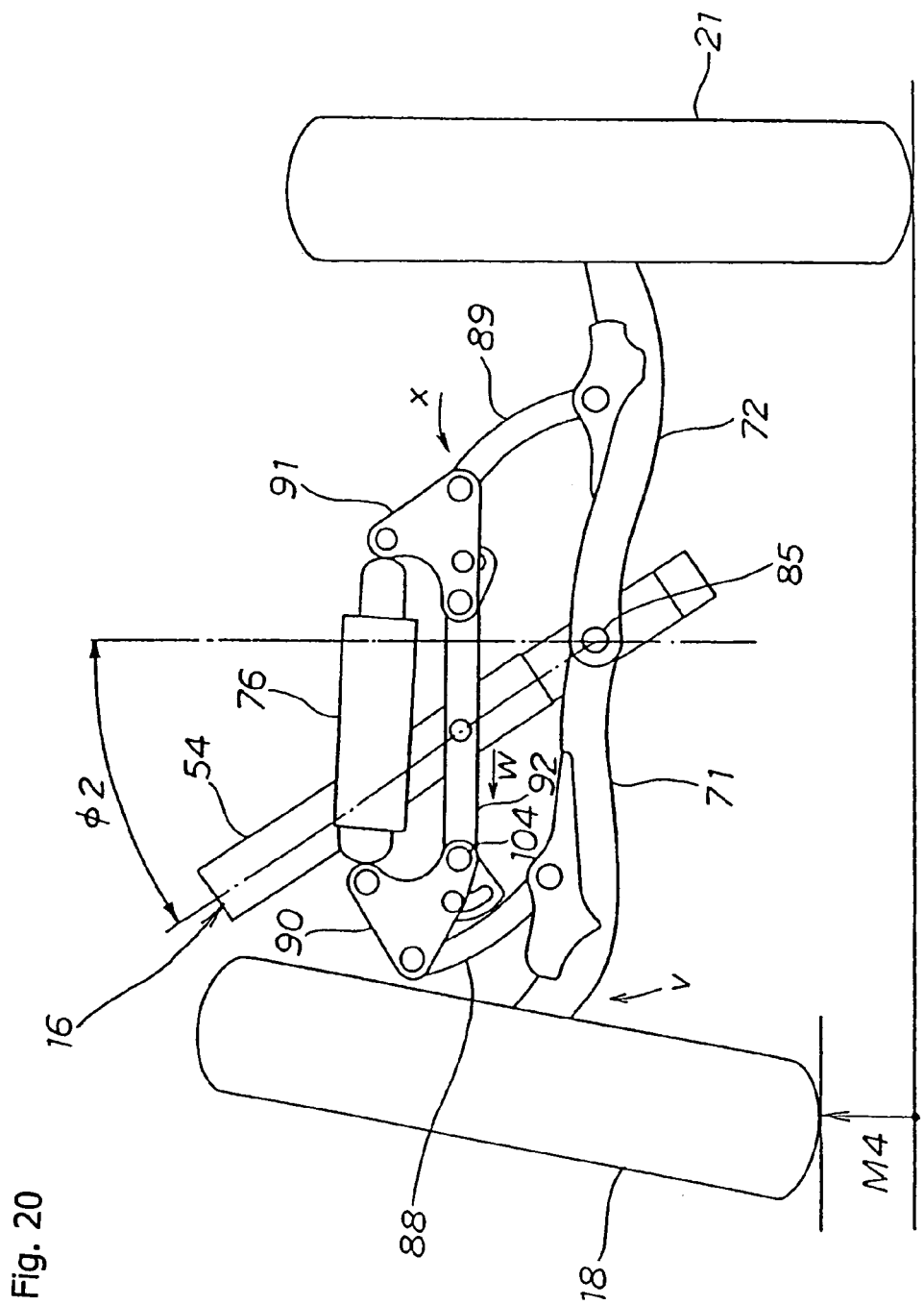
FIG. 20 is a fifth rear elevational effect view showing the effects achieved by the rear suspension according to an illustrative embodiment of the present invention.

FIG. 20 is a fifth effect diagram showing the effects achieved by the rear suspension according to the present invention.

From the state of FIG. 11, when the rear wheel 18 moves upward by an amount of motion M4, and the main frame cage 16, in this example, the L pipe 54 rocks towards the left of the vehicle body by an angle of $\phi2$, the wishbone suspension arm 71 swings upward as an arrow v about the rear pivot post 85 and the front pivot post 136 (refer to FIG. 9), and the connection bar 92 moves toward the left as indicated by an arrow w. In response thereto, the arc-shaped reinforcing link 88 moves upward and tilts toward the left, and the arc-shaped link 89 tilts leftward as indicated by an arrow x. The bell crank 90 swings clockwise with the second bolt 104 serving as a fulcrum, and moves toward left. The bell crank 91 moves leftward, and resultantly compresses the shock absorber 76. As such, the buffer effects can be achieved.

FIGS. 21(a) and (b) are both a back side view provided for the comparison purpose of total length of the drive shaft, and specifically, (a) shows an example (present embodiment), and (b) shows a comparative example.

In the example of FIG. 21(a), one end of the drive shaft 73 is attached to the third and fourth cases 168 and 169 provided on the right side of the gearbox 81, and an end of the drive shaft 74 is attached to the first and second cases 166 and 167 provided on the left side of the gearbox 81. In the drawing, circle marks denote constant velocity joints 196, 198, 206, and 208. Herein, the distance LL1 between the constant velocity joints 196 and 198 is presumably the total length of the drive shaft 73.

In the comparative example of FIG. 21(b), an end of a left drive shaft 352 is attached to the left side of a gearbox 351, and an end of a right drive shaft 353 is attached to the right side of the gearbox 351. In the drawing, circle marks denote constant velocity joints 355, 356, 357, and 358. Herein, the distance LL2 between the constant velocity joints 355 and 356 is presumably the total length of the drive shaft 352. Note that, 361 and 362 both denote a rear wheel, 363 and 364 both denote a suspension arm, and 365 denotes a main frame cage.

In the above FIGS. 21(a) and (b), LL1>LL2.

Described next are the effects of the drive shafts 73 and 74, the left drive shaft 352, and the right drive shaft 353 described in the above.

FIGS. 22(a) to (c) are all an effect diagram illustrating the effects achieved by the drive shaft (example) according to the present invention.

In FIG. 22(a), when the left rear wheel 18 moves upward by the amount of motion M1, the drive shaft 73 pivots at the constant velocity joint 196, and the resulting bending angle will be $\alpha1$.

In FIG. 22(b), when the main frame cage 16 rocks toward the left side of the vehicle body by an angle of $\phi1$, the gearbox 81 rocks together therewith. The drive shaft 73 pivots at the constant velocity 196, and the resulting angle will be $\alpha2$.

In FIG. 22(c), when the rear wheel 18 moves upward by the amount of motion M4, and when the main frame cage 16 rocks toward the left of the vehicle body by an angle of $\phi2$, the gearbox 81 rocks together therewith. The drive shaft 73 pivots at the constant velocity joint 196, and the resulting angle will be $\alpha3$. This pivoting angle $\alpha3$ is in the acceptable range for pivoting of the constant velocity joint 196.

Figure 23A:
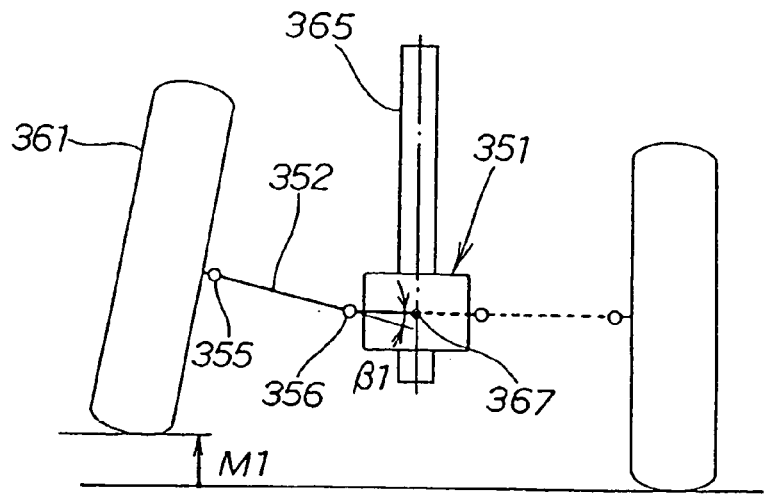
FIGS. 23(a), (b), and (c) are rear elevational effect views illustrating the effects achieved by the drive shaft of the comparative example according to an illustrative embodiment of the present invention.
Figure 23B:
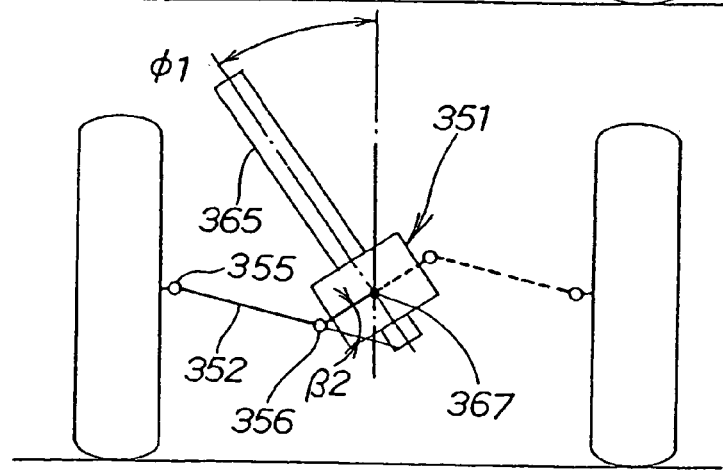
Figure 23C:
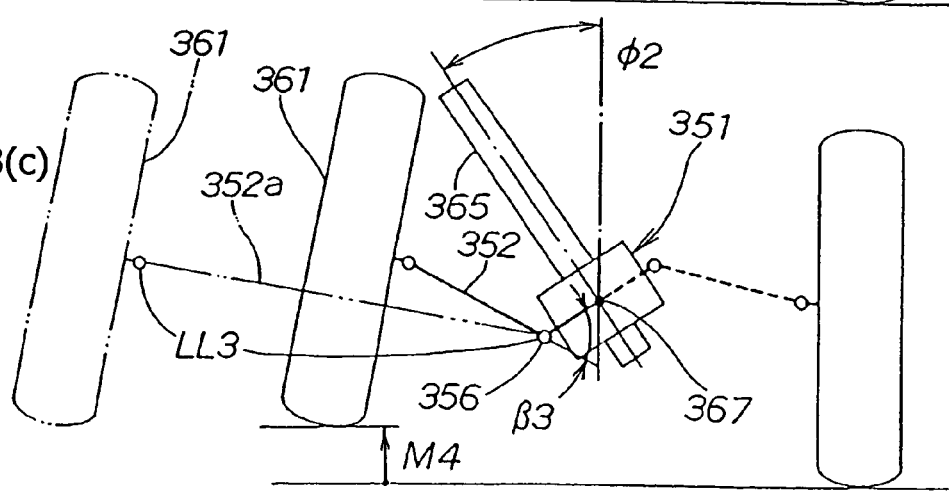
Figure 25:
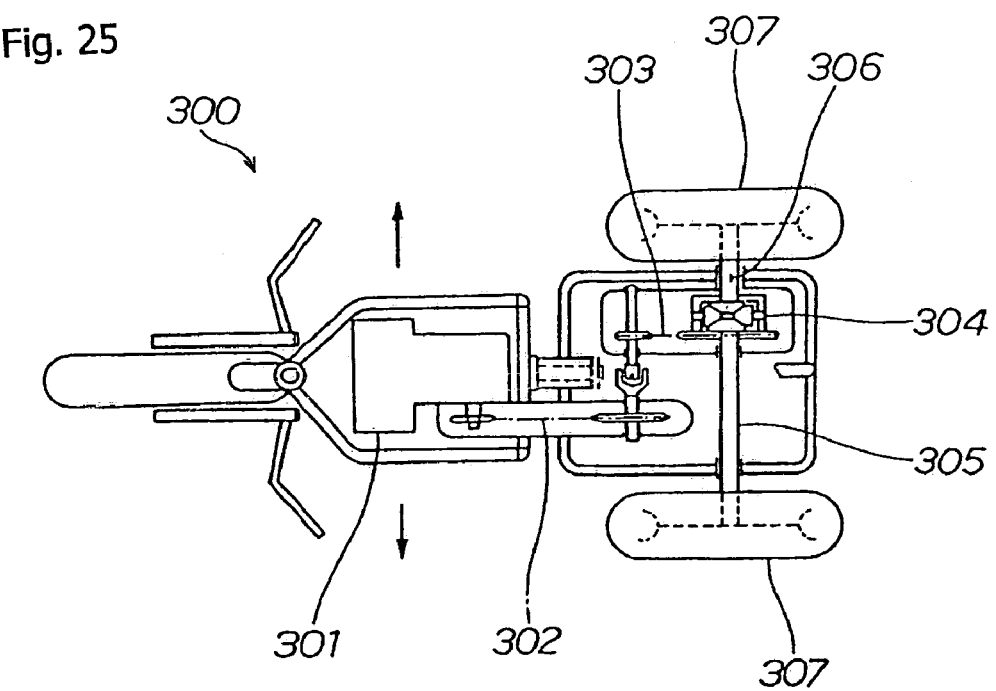
FIG. 25 is a plan view showing the power transmission mechanism of a conventional vehicle according to the prior art.
Figure 26:
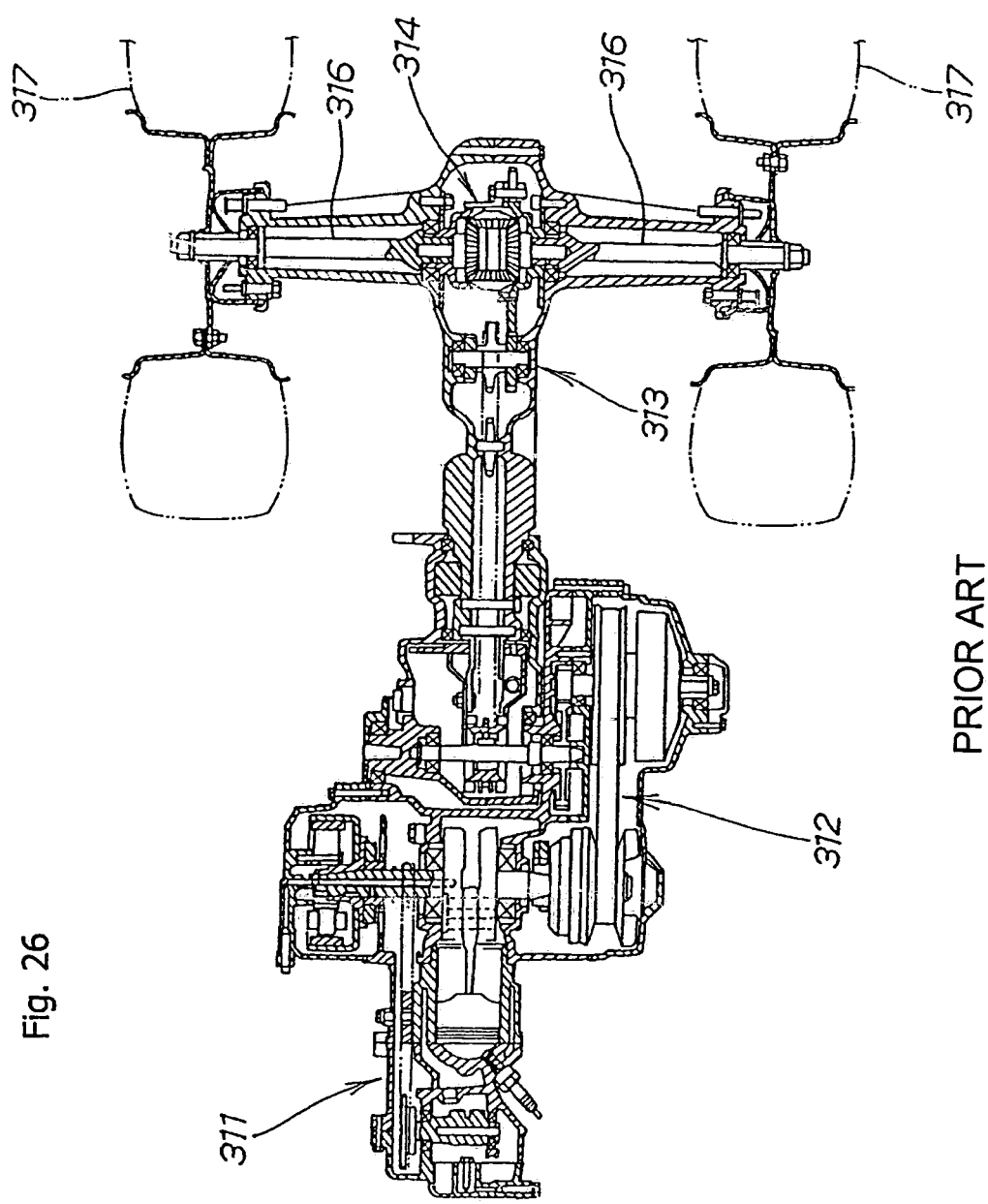
FIG. 26 is a cross-sectional view showing the power transmission mechanism of another conventional vehicle according to the prior art.

FIGS. 23(a) to (c) are all an effect diagram illustrating the effects achieved by the drive shaft in the comparative example.

In FIG. 23(a), when the left rear wheel 361 moves upward by the amount of motion M1, the left drive shaft 352 pivots at the constant velocity joint 356, and the resulting pivoting will be $\beta1$.

In FIG. 23(b), when the main frame cage 365 rocks toward the left side of the vehicle body by an angle of $\phi1$, the gearbox 351 rocks together therewith. The drive shaft 352 pivots at the constant velocity joint 356, and the resulting angle will be $\beta2$.

In FIG. 23(c), when the rear wheel 361 moves upward by the amount of motion M4, and when the main frame cage 365 rocks toward the left of the vehicle body by an angle of $\phi2$, the gearbox 351 rocks together therewith. The drive shaft 352 pivots at the constant velocity joint 356, and the resulting angle will be $\beta3$.

This pivoting angle $\beta3$ will show $\beta3>\beta3$ in comparison with the pivoting angle $\alpha3$ of FIG. 22(c).

Here, to make the pivoting angle β3 to be the pivoting angle α3, there is a need to increase the total length of the drive shaft (reference numeral thereof is 352a) to be LL3. It means the vehicle width is increased.

In consideration thereof, in the present invention, as described by referring to FIG. 13, the coupling positions of the drive shafts 73 and 74 to the gearbox 81 are offset along the front and rear of the line connecting the axles with the rear wheel 18 and the rear wheel 21 (i.e., external shafts 201 and 211). This allows diagonal placement of the drive shafts 73 and 74 in the vehicle width direction. As a result, in spite of increasing the total length of the drive shafts 73 and 74, the treads of the rear wheels 18 and 21 can be reduced.

The comparative examples shown in FIGS. 23(a) to (c) are those in which the rocking axis 367 of the main frame cage 365 does not coincide with the pivoting part of the left drive shaft 352 (i.e., constant velocity joint 356 in the drawing). The examples shown in FIGS. 22(a) to (c) are those in which the pivoting part of the drive shaft 73 (i.e., constant velocity joint 196 in the drawing) is placed on the rocking axis of the main frame cage 16. As such, the example in which the pivoting part is placed on the rocking axis shows the smaller pivoting angle of the constant velocity joint, and the tread of the rear wheel can be smaller.

Further, in comparison with FIG. 22(b) and FIG. 23(b), the center shaft of the drive shaft 73 remains still in the example even if the main frame cage 16 rocks, and in the comparative example, the center shaft of the left drive shaft 352 swings about the constant velocity joint 355 when the main frame cage 365 rocks. As a result, by the inertial moment of the center shaft, there needs larger external forces to swing the main frame cage 365. Accordingly, this impairs the mobility of the three-wheeled motor vehicle.

As described by referring to FIGS. 9, 12, and 15, the present invention is directed to, first, the three-wheeled motor vehicle 10 with the rocking mechanism (refer to FIG. 1) in which the main frame cage 16 is provided with the front pivot post 136 and the rear pivot post 85 (refer to FIG. 7), and the right and left wishbone suspension arms 71 and 72 are pivotally attached to the main frame cage 16 for pivotal movement about these swing axes 136 and 85. The rear wheels 18 and 21 are attached to these wishbone suspension arms 71 and 72, to make the main frame cage 16 swingable about the rocking axes, i.e., the swing axes 136 and 85, with respect to the wishbone suspension arms 71 and 72.

Further, the engine output is transferred to the right and left rear wheels 18 and 21 via the continuously variable transmission 78, the gearbox 81, and the right and left internal shafts 195 and 205 provided to the gearbox 81, featuring the axial lines 241 and 242 of the right and left internal shafts 195 and 205 are both intersected with the straight line 237 serving as the rocking axis, and the resulting intersection points 246 and 247 are placed at each different position.

By the axial lines 241 and 242 of the right and left internal shafts 195 and 205 intersecting with the straight line 237, when the right and left internal shafts 195 and 205 are coupled with the rear wheels 18 and 21 via the drive shafts 73 and 74, respectively, the drive shafts 73 and 74 do not displace that much even if the main frame cage 16 rocks in the lateral direction. What is better, by placing the intersection points 246 and 247 of the right and left internal shafts 195 and 205 with the straight line 237 at each different position, for example, in the present invention, the drive shafts 73 and 74 can be placed extensively in the diagonal direction from the right and left internal shafts 195 and 205 toward the rear wheels 18 and 21 if the right and left internal shafts 195 and 205 are placed to be away from each other in the fore and aft direction of the vehicle body. In this case, compared with the case where the right and left internal shafts 195 and 205 on the side part of the continuously variable transmission 78 or the gearbox 81, the drive shafts 73 and 74 can be increased in total length. As is known from the above, the pivoting angles of the drive shafts 73 and 74 can be suppressed to a small value when the rear wheels 18 and 21 move in the vertical direction. What is better, the rear wheels 18 and 21 can be smaller in tread because the drive shafts 73 and 74 are placed extensively in the diagonal direction even if long in total length. Accordingly, these contribute to reduce the width of the vehicle.

Second, the present invention discloses that the rear wheels 18 and 21 are coupled to the internal shafts 195 and 205 via the drive shaft 73 including a pair of constant velocity joints 196 and 198 (refer to FIG. 13) and the drive shaft 74 including a pair of constant velocity joints 206 and 208 (refer to FIG. 13). In detail, the internal shafts 195 and 205 of the drive shafts 73 and 74 serve as output axes, and the pivoting parts of the constant velocity joints 196 and 206 on the side of the internal shafts 195 and 205, i.e., the intersection points 246 and 247, are placed on the straight line 237.

By such a placement of the constant velocity joints 196 and 206 on the side of internal shafts 195 and 205 on the straight line 237, the constant velocity joints 196 and 206 remain still even if the internal shafts 195 and 205 tilt responding to rocking of the main frame cage 16 in the lateral direction. Accordingly, even if drive shafts 73 and 74 swing together with the wishbone suspension arms 71 and 72, the pivoting angles of the constant velocity joints 196 and 206 can be reduced.

Third, the present invention discloses that the gearbox 81 includes the differential mechanism 172, and in the front and rear of this differential mechanism 172, the right and left internal shafts 195 and 205 are placed.

This allows easy connection, using a gear and others, the right and left internal shafts 195 and 205 to the left differential axis 173 and the right differential axis 174 being two axes on the output side of the differential mechanism 172, thereby achieving the gearbox 81 compact in size.

Fourth, the present invention discloses that a swing axis and a rocking axis are the same axis, that is, the front pivot post 136 and the rear pivot post 85 serve as those.

By using the swing axis and the rocking axis as the front swing axis 136 and the rear pivot post 85, the wishbone suspension arms 71 and 72 can be placed more inside in the present invention compared with the case of placing any two swing axes away from each other in the vehicle width direction. Accordingly, the wishbone suspension arms 71 and 72 can remain long, the right and left rear wheels 18 and 21 can be smaller in tread, and the vehicle width can be reduced. Further, the swing axis and the rocking axis serve as one axis, whereby the number of the components can be less, and the cost reduction can be thus achieved.

Fifth, the present invention discloses that the pin 187 structuring the differential mechanism 172 passes through the straight line 237.

By structuring the gearbox 81 including the differential mechanism 172 to rock with the main frame cage 16, the inertial moment of the differential mechanism 172 rotating about the straight line 237 as a rotation axis when the main frame cage 16 rocks. This is because the pin 187 is locating in the center of the differential mechanism 172. Thereby, for example, the main frame cage 16 can rock with a quick motion, successfully increasing the mobility of the three-wheeled motor vehicle 10 with the rocking mechanism.

Sixth, the present invention discloses that the main frame cage 16 includes therein the engine 34, the continuously variable transmission 78, the gearbox 81, and the right and left internal shafts 195 and 205. Accordingly, these components are in such a structure as to rock with respect to the right and left wishbone suspension arms 71 and 72.

When the shock absorber 76 (refer to FIG. 11) as a suspension spring is provided on the side of the wishbone suspension arms 71 and 72, the engine 34, the continuously variable transmission 78, the gearbox 81, and the right and left internal shafts 195 and 205 are not located on the side of the wishbone suspension arms 71 and 72. The unspring weight can be thus considerably reduced, and the ride comfort can be better to a greater degree.

FIGS. 24(a) and (b) are both a side view showing another embodiment of the gear train of the gearbox according to the present invention.

FIG. 24(a) shows a gearbox 251 in which the first left gear 176 is engaged with the second left gear 178, the first right gear 177 is engaged with the second right gear 181, the rotation center 234 of the second left gear 178 and the rotation center 236 of the second right gear 181 are placed on the straight line 237, and the straight line 237 is offset upward against the first left gear 176 and the rotation center 235 of the second left gear 177 by an offset amount e1. Herein, the distance between the rotation centers 234 and 236 is presumably D2.

As described in the foregoing, by offsetting the straight line 237 upward, the second left gear 178 and the second right gear 181 come closer to the center of the gearbox 251, thereby making the gearbox 251 compact in size. Further, assuming that the height of the straight line 237 from the ground is the same as that shown in FIG. 14, the barycenter of the gearbox 251 can be lower than that of the gearbox 81 of FIG. 14.

FIG. 24(b) shows a gearbox 252 in which the first left gear 176 is engaged with the second left gear 178, the first right gear 177 is engaged with the second right gear 181, the rotation center 234 of the second left gear 178 and the rotation center 236 of the second right gear 181 are placed on the straight line 237, and the straight line 237 is offset downward against the first left gear 176 and the rotation center 235 of the second left gear 177 by an offset amount e2. Herein, the distance between the rotation centers 234 and 236 is presumably D3.

As described above, by offsetting the straight line 237 downward, the longitudinally-long gearbox 252 can be used if suited for the device.

Moreover, in the above FIGS. 24(a) and (b), and FIG. 14, with the gearbox 251 of 24(a) and the gearbox 252 of 24(b), the straight line 237 is offset against the rotation center 235 by a predetermined distance. Thereby, compared with the gearbox 81 of FIG. 14, the distances D2 and D3 can be both shorter than the distance D1. That is, D2<D1, and D3<D1. Accordingly, the gearboxes 251 and 252 can be reduced in outer dimension in the fore and aft direction compared with the gearbox 81, and by extension, the three-wheeled motor vehicle with the rocking mechanism can be shorter in total length.

The present invention exerts the following effects with the above structure:

In the three-wheeled motor vehicle according to the first aspect hereof, the right and left output axes both intersect the rocking axis, and their intersection points are not coincident. Accordingly, with such a structure that the right and left output axes each intersect with the rocking axis, through coupling of the right and left output axes with the rear drive wheels each via a drive shaft, the drive shafts do not displace that much even if the main frame cage rocks in the lateral direction. Further, the resulting intersection points of the right and left output axes and the rocking axis are respectively placed at different positions along the rocking axis. Accordingly, if the right and left output axes are so provided as to be spaced apart from each other in the front and rear direction of the vehicle body, in the present invention, the drive shafts can be placed extensively in the diagonal direction from the right and left output axes to the rear drive wheel side. Compared with a case where the right and left output axes are provided on the side part of the transmission or the reduction gear, the drive shaft can be increased in its total length. In consideration thereof, the pivoting angle of the drive shaft can be suppressed to a small value when the rear drive wheels move in the vertical direction, and what is better, the tread of the rear drive wheels can be reduced because the drive shaft is placed extensively in the diagonal direction even if it is long in total length.

In the three-wheeled motor vehicle according to the second aspect hereof, the rear drive wheel is coupled to the output axis via the drive shaft including a pair of constant velocity joints, and a pivoting part of the constant velocity joint on the output axis side is placed on the rocking axis. Accordingly, even if the output axis tilts responding to the vehicle body moving in the lateral direction, the constant velocity joint remains still. Thus, even if the drive shaft swings together with the suspension arms, the pivoting angle of the constant velocity joint can be reduced.

In the three-wheeled motor vehicle according to the third aspect hereof, the reduction gear includes a differential mechanism, and the right and left output axes are placed in the front and rear of the differential mechanism. This allows easy connection of two axes on the output side of the differential mechanism to right and left output axes using a gear and others, thereby realizing the reduction gear compact in size.

In the three-wheeled motor vehicle according to the fourth aspect hereof, the swing axis and the rocking axis are the same axis. Thus, the suspension arms can be shorter compared with a case where any two swing axes are so provided as to be away from each other in the vehicle width direction. Accordingly, this reduces the tread of the right and left rear drive wheels, and narrows down the vehicle width. What is more, the number of components can be reduced, and cost reduction can be thus achieved.

In the three-wheeled motor vehicle according to the fifth aspect hereof, the differential pinion axis structuring the differential mechanism passes through the rocking axis. In a case of structuring the reduction gear including the differential mechanism to rock with the main frame cage, the differential pinion axis comes to the center of the differential mechanism. Thus, the inertial moment of the differential mechanism about the rocking axis can be reduced when the main frame cage rocks. As such, the main frame cage can rock with a quick motion, successfully increasing the mobility of the three-wheeled motor vehicle.

In the three-wheeled motor vehicle according to the sixth aspect hereof, through placement of the engine, the transmission, the reduction gear, and the right and left output axes in the main frame cage, these components structurally rock against the right and left rear drive wheels. With such a structure having no engine, transmission, reduction gear, nor right and left output axes on the side of the suspension arms, when a suspension spring is provided on the side of the suspension arms, the unsprung weight can be considerably reduced. Accordingly, the ride comfort can be better to a greater degree.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications which are within the scope of the claims are intended to be within the scope and spirit of the present invention.

Having thus, described the invention, what is claimed is:

1. A three-wheeled motor vehicle comprising:
   a main frame cage provided with a swing axis,
   an engine operatively attached to and supported by the main frame cage;
   right and left wishbone suspension arms which are each respectively attached to the main frame cage for pivotal movement about the swing axis,
   a rear drive wheel operatively attached to each of the respective wishbone suspension arms,
   a transmission for transmitting power output from said engine to a drive train;
   the drive train comprising a reduction gear and right and left drive shafts defining right and left output axes, respectively;
   wherein the main frame cage is made pivotally rockable about a rocking axis with respect to the wishbone suspension arms,
   wherein engine output is transferred to the right and left rear drive wheels via the transmission, the reduction gear, and the right and left drive shafts.

2. The three-wheeled motor vehicle of claim 1, wherein each of the right and left output axes intersect with the rocking axis to define intersection points, and wherein said intersection points are displaced from one another on the rocking axis.

3. The three-wheeled motor vehicle of claim 1, wherein each rear drive wheel is operatively connected to the drive train via the respective drive shaft and a pair of constant velocity joints, and wherein a bending part of one of said constant velocity joints for each wheel, on a side of the output axis, is placed on the rocking axis.

4. The three-wheeled motor vehicle according to claim 1, wherein the reduction gear includes a differential mechanism;
   wherein a first of said output axes is placed in front of the differential mechanism;
   and wherein a second of said output axes is placed behind the differential mechanism.

5. The three-wheeled motor vehicle according to claim 1, wherein the swing axis and the rocking axis coincide.

6. The three-wheeled motor vehicle according to claim 4, wherein the differential mechanism comprises a differential pinion axis, which intersects the rocking axis.

7. The three-wheeled motor vehicle according to claim 1, wherein, through placement of the engine, the transmission, the reduction gear, and the right and left drive shafts in relation to the main frame cage, the engine, the transmission, the reduction gear, and the right and left output axes are pivotally rockable relative to the wishbone suspension arms.

8. A reinforcing support structure for a three-wheeled motor vehicle, said reinforcing support structure comprising:
   a rear wheel support structure for supporting left and right rear wheels, and
   a main frame cage pivotally supported at a single location on the rear wheel support structure for pivotal rocking movement thereon about a single rocking axis;
   wherein said rear wheel support structure comprises:
      left and right wishbone arms which are pivotally connected to one another;
      left and right reinforcing links which are respectively attached to and extend upwardly from the respective left and right wishbone arms; and
      an intermediate bar extending between, and operatively attached to upper portions of the left and right reinforcing links.

9. The reinforcing support structure of claim 8, wherein said rear wheel support structure further comprises a pair of bell cranks operatively attached to opposite ends of the intermediate bar, wherein the bell cranks connect the intermediate bar to the respective reinforcing links.

10. The reinforcing support structure of claim 9, wherein said rear wheel support structure further comprises a shock absorber extending between and interconnecting upper ends of said bell cranks.

* * * * *